United States Patent
Miyamoto et al.

(10) Patent No.: US 8,705,794 B2
(45) Date of Patent: Apr. 22, 2014

(54) DATA PROCESSING APPARATUS AND DATA PROCESSING METHOD

(75) Inventors: Shingo Miyamoto, Hyogo (JP); Masaya Yamamoto, Kanagawa (JP); Kouji Miura, Osaka (JP); Minehisa Nagata, Osaka (JP)

(73) Assignee: Panasonic Corporation, Osaka (JP)

( * ) Notice: Subject to any disclaimer, the term of this patent is extended or adjusted under 35 U.S.C. 154(b) by 301 days.

(21) Appl. No.: 13/258,773

(22) PCT Filed: Jan. 13, 2011

(86) PCT No.: PCT/JP2011/000117
§ 371 (c)(1),
(2), (4) Date: Sep. 22, 2011

(87) PCT Pub. No.: WO2011/093013
PCT Pub. Date: Aug. 4, 2011

(65) Prior Publication Data
US 2012/0020525 A1 Jan. 26, 2012

(30) Foreign Application Priority Data

Jan. 29, 2010 (JP) ................................ 2010-018146
Jan. 29, 2010 (JP) ................................ 2010-018147

(51) Int. Cl.
*G06K 9/00* (2006.01)
(52) U.S. Cl.
USPC ........... 382/103; 382/107; 382/135; 382/148; 382/190; 382/294; 348/77; 348/148
(58) Field of Classification Search
USPC .................... 382/103, 190; 345/475
See application file for complete search history.

(56) References Cited

U.S. PATENT DOCUMENTS

| | | | | |
|---|---|---|---|---|
| 5,198,896 A | * | 3/1993 | Kondo et al. | 348/207.99 |
| 5,708,845 A | * | 1/1998 | Wistendahl et al. | 715/202 |
| 5,970,504 A | * | 10/1999 | Abe et al. | 715/205 |
| 6,570,586 B1 | * | 5/2003 | Kamen et al. | 715/719 |
| 6,810,148 B2 | * | 10/2004 | Kaneko et al. | 382/190 |
| 6,839,465 B2 | * | 1/2005 | Kaneko et al. | 382/190 |
| 6,940,997 B1 | * | 9/2005 | Kaneko et al. | 382/103 |

(Continued)

FOREIGN PATENT DOCUMENTS

| | | |
|---|---|---|
| JP | 2000-285253 | 10/2000 |
| JP | 2004-55658 | 2/2004 |

(Continued)

OTHER PUBLICATIONS

International Search Report issued Mar. 22, 2011 in International (PCT) Application No. PCT/JP2011/000117.

*Primary Examiner* — Jayesh A Patel
*Assistant Examiner* — Iman K Kholdebarin
(74) *Attorney, Agent, or Firm* — Wenderoth, Lind & Ponack, L.L.P.

(57) ABSTRACT

A data processing apparatus that determines a target region within a picture contained in a video content, on the basis of a trajectory input by a user in order to surround a moving object in the video content. The data processing apparatus includes an input unit configured to receive input data showing the trajectory input by the user in the displayed video content, and a correction unit configured to correct an input region, which is a region specified by the trajectory expressed by the input data, to thereby determine the target region.

19 Claims, 39 Drawing Sheets

(56) References Cited

U.S. PATENT DOCUMENTS

| | | | |
|---|---|---|---|
| 7,239,722 B2* | 7/2007 | Kaneko et al. | 382/107 |
| 7,304,649 B2* | 12/2007 | Hori et al. | 345/619 |
| 7,925,053 B2* | 4/2011 | Altherr | 382/107 |
| 7,990,385 B2* | 8/2011 | Kake et al. | 345/473 |
| 8,131,015 B2* | 3/2012 | Hildreth et al. | 382/103 |
| 8,229,163 B2* | 7/2012 | Coleman et al. | 382/103 |
| 2001/0040924 A1* | 11/2001 | Hori et al. | 375/240.16 |
| 2003/0044071 A1 | 3/2003 | Kaneko et al. | |
| 2003/0044072 A1 | 3/2003 | Kaneko et al. | |
| 2003/0053539 A1 | 3/2003 | Kaneko et al. | |
| 2003/0086613 A1 | 5/2003 | Kaneko et al. | |
| 2007/0025444 A1 | 2/2007 | Okada et al. | |
| 2007/0211945 A1 | 9/2007 | Kaneko et al. | |
| 2007/0217684 A1 | 9/2007 | Kaneko et al. | |
| 2007/0217685 A1 | 9/2007 | Kaneko et al. | |
| 2007/0274595 A1 | 11/2007 | Kaneko et al. | |
| 2009/0129678 A1 | 5/2009 | Sukeda et al. | |

FOREIGN PATENT DOCUMENTS

| | | |
|---|---|---|
| JP | 2004-227423 | 8/2004 |
| JP | 2008-11455 | 1/2008 |
| JP | 2008-146491 | 6/2008 |
| JP | 2009-129039 | 6/2009 |

* cited by examiner

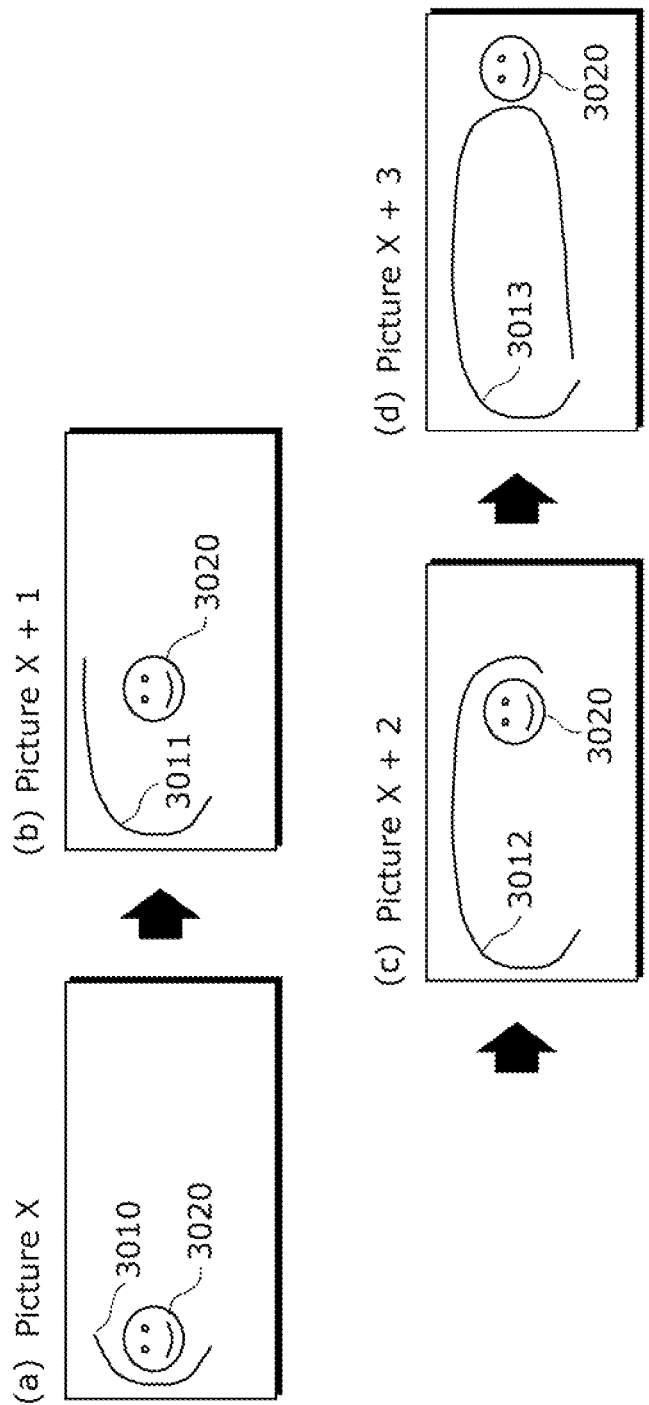

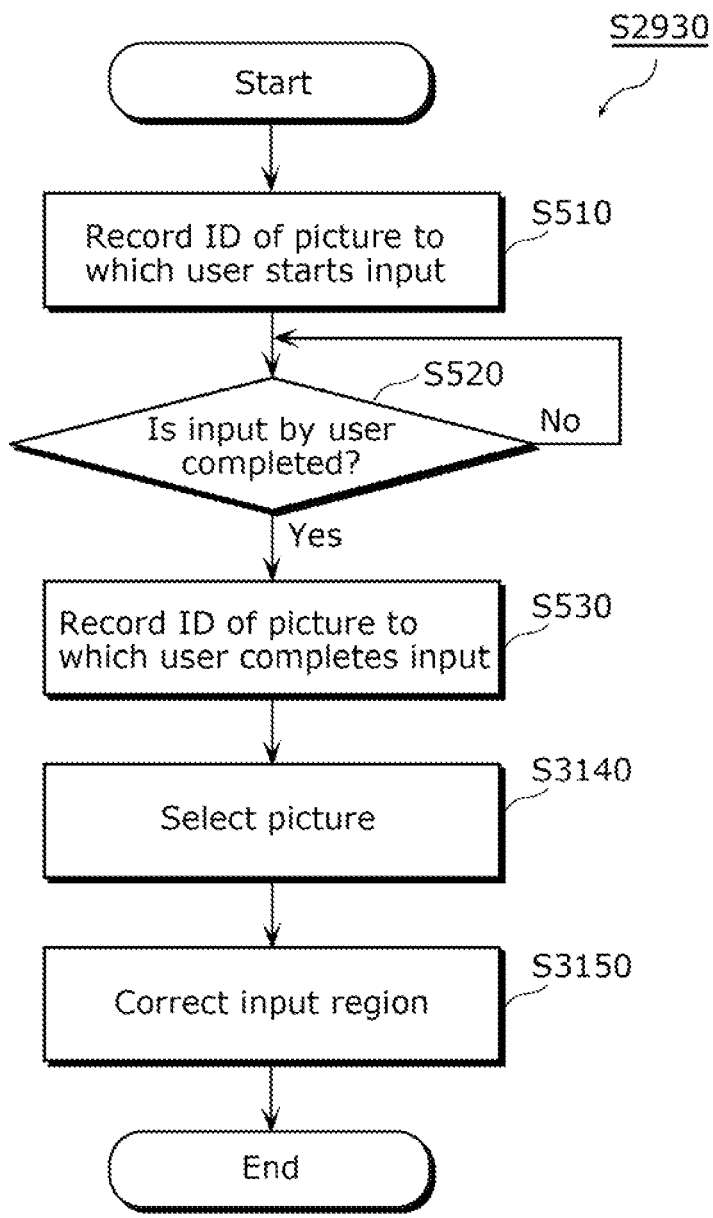

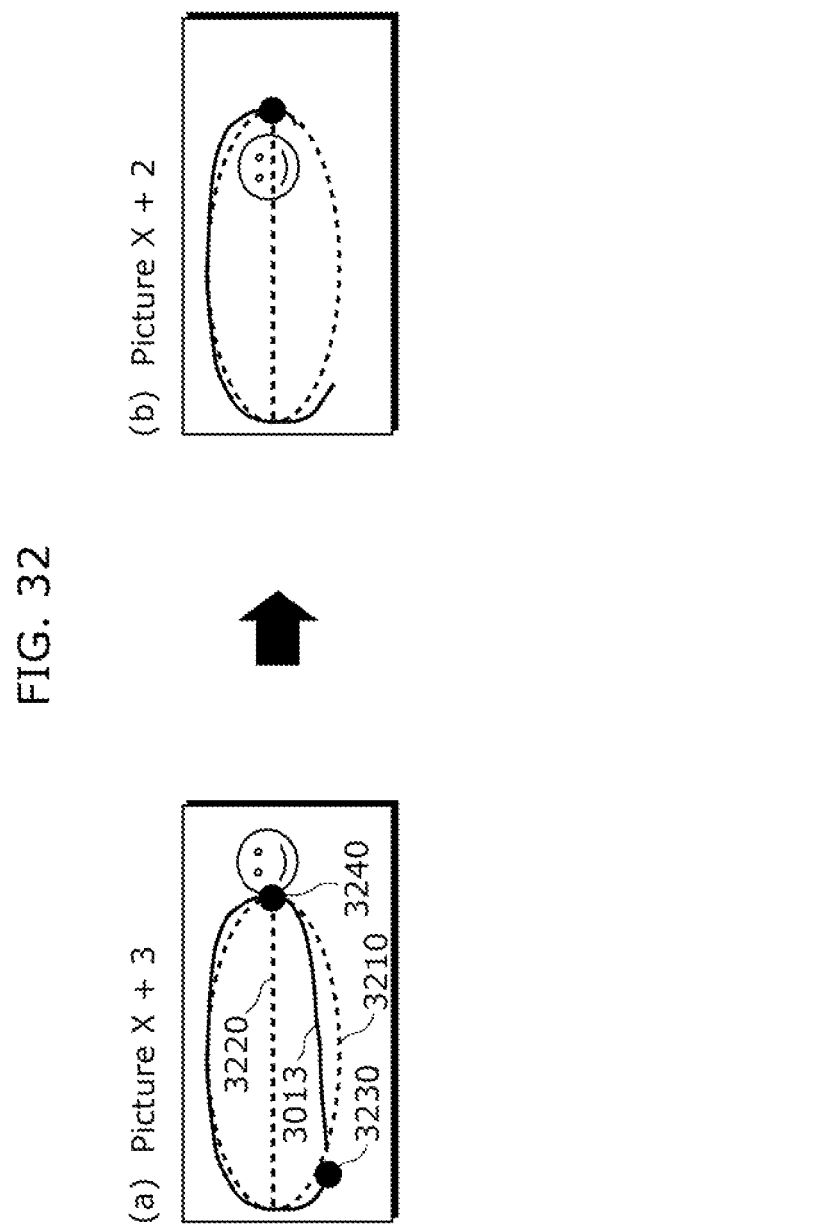

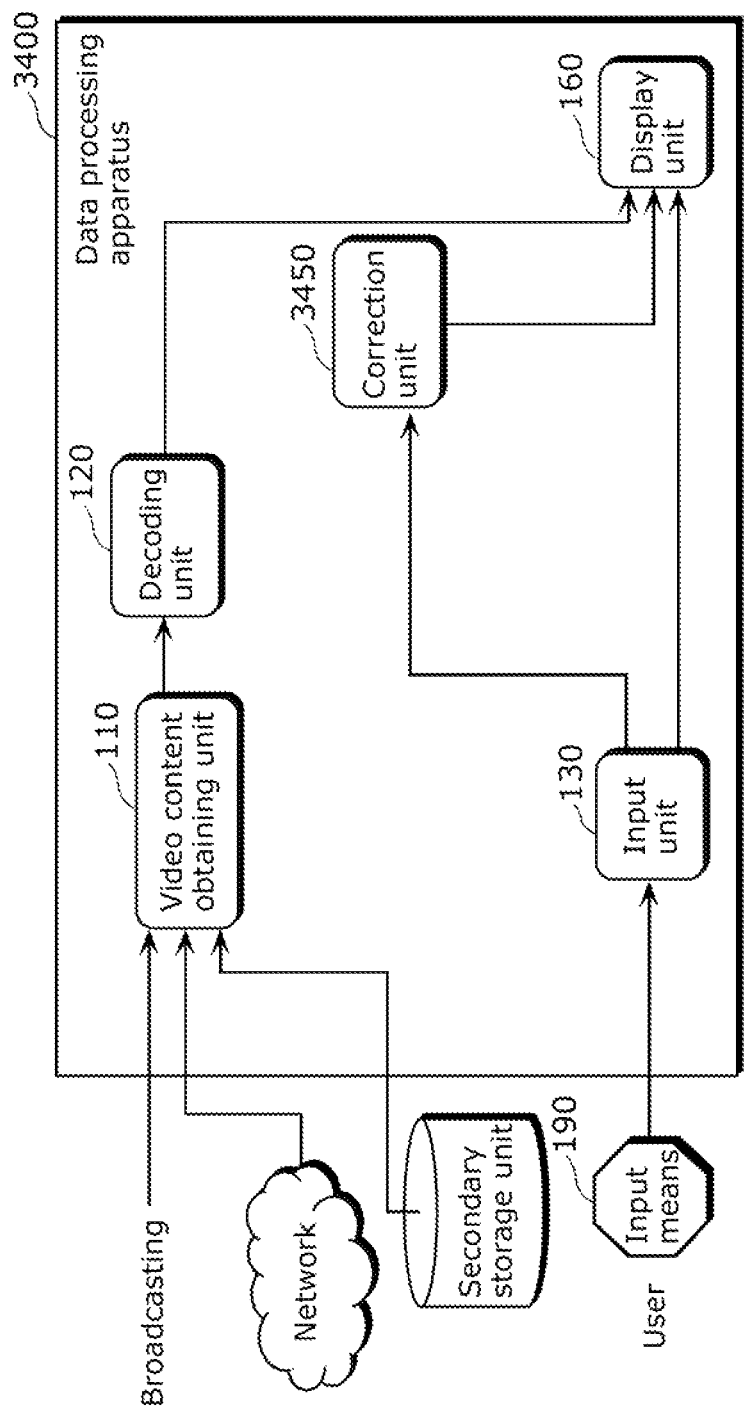

DATA PROCESSING APPARATUS AND DATA PROCESSING METHOD

TECHNICAL FIELD

The present invention relates to a data processing apparatus and data processing method that determine a target region within a picture contained in a video content on the basis of a trajectory input by a user in order to surround a moving object in the video content.

BACKGROUND ART

Recently, a user has dramatically increased opportunities to use a video content other than viewing of TV (television) broadcasting because of development of the digital techniques and the Internet and popularity of video posting sites. The user enters a keyword at a video posting site such as YouTube (registered trademark) or a search site such as Google (registered trademark), and retrieves a desired content. Unfortunately, in this method, elements having no keyword cannot be retrieved. Accordingly, a method by which the video content can be retrieved more simply and securely has been examined. For example, there has been proposed a method in which other video content is retrieved directly from one video content. As a conventional method for retrieving other video content from one video content, a method has been disclosed in which a video content is retrieved using part of a region of one still picture that forms the video content (for example, see Patent Literature 1).

CITATION LIST

Patent Literature

[PTL 1] Japanese Unexamined Patent Application Publication No. 2008-146491

SUMMARY OF INVENTION

Technical Problem

In the conventional method, in the case where the user desires to pay attention to one region within the video content for retrieval, the user needs to designate an object by using an input means such as a mouse to surround the object. The object is moving within the video content, however. For this reason, input of a trajectory in order to surround the object is out of order, and as a result, the region specified by the input trajectory is not always an appropriate region for retrieval.

Accordingly, in order to solve the problem above, an object of the present invention is to provide a data processing apparatus and data processing method that can properly determine a target region within a picture contained in a video content on the basis of a trajectory input by a user in order to surround a moving object in the video content.

Solution to Problem

In order to achieve the object above, a data processing apparatus according to one embodiment of the present invention is a data processing apparatus that determines a target region within a picture contained in a video content on the basis of a trajectory input by a user in order to surround a moving object in the video content, the data processing apparatus including: an input unit configured to receive input data showing the trajectory input by the user in the video content displayed; and a correction unit configured to correct an input region, which is a region specified by the trajectory expressed by the input data, to thereby determine the target region.

According to the configuration, the input region, which is a region specified by the trajectory expressed by the input data, can be corrected to thereby determine the target region. Accordingly, in the case where the input region is not an appropriate region, the input region can be corrected, and the target region can be properly determined.

Preferably, the input data is data showing the trajectory input by the user across several pictures contained in the video content; the data processing apparatus further includes a movement calculation unit configured to calculate an amount of movement and moving direction of an image within the input region in the several pictures; and the correction unit is configured to correct the input region using the calculated amount of movement and moving direction of the image within the input region, to thereby determine the target region.

According to the configuration, the input region can be corrected using the amount of movement and moving direction of the image within the input region. Usually, the input region contains the object that the user intends to surround. Accordingly, according to the configuration, the input region can be corrected according to the movement of the object. Thereby, even if the movement of the object causes the input of the trajectory to be out of order, the input region can be corrected using the movement, and the target region can be properly determined. Namely, the region containing the object can be properly determined as the target region.

Preferably, the correction unit is configured to determine, as the target region, an intersection of a region after movement obtained by moving the input region according to the amount of movement and moving direction of the image within the input region and the input region. In this case, for example, the correction unit may be configured to determine an intersection of the region after movement obtained by moving the input region in the moving direction by the amount of movement and the input region as the target region in a final picture among the several pictures. Alternatively, for example, the correction unit may be configured to determine an intersection of the region after movement obtained by moving the input region in a direction opposite to the moving direction by the amount of movement and the input region as the target region in an initial picture among the several pictures.

According to these configurations, the intersection of the region after movement obtained by moving input region according to the amount of movement and moving direction and the input region can be determined as the target region. Accordingly, even if the input region becomes larger than necessary because the user follows the movement of the object, the region that contains the object and is smaller than the input region can be determined as the target region. As a result, the target region can be properly determined.

Preferably, the correction unit is configured to compress the input region according to the amount of movement and the moving direction, to thereby determine the target region. In this case, for example, the correction unit may be configured to compress the input region in the moving direction by the amount of movement, to thereby determine the target region in the final picture among the several pictures. Alternatively, for example, the correction unit may be configured to compress the input region in the direction opposite to the moving direction by the amount of movement, to thereby determine the target region in the initial picture among the several pictures.

According to these configurations, the input region can be compressed according to the amount of movement and moving direction to thereby determine the target region. Accordingly, even if the input region becomes larger than necessary because the user follows the movement of the object, the region that contains the object and is smaller than the input region can be determined as the target region. As a result, the target region can be properly determined.

Preferably, the movement calculation unit is configured to select at least one pixel group in at least initial one picture among the several pictures on the basis of the input trajectory, and calculate an amount of movement and moving direction of the selected pixel group as the amount of movement and moving direction of the image within the input region.

According to the configuration, in at least initial one picture among the several pictures, at least one pixel group can be selected on the basis of the input trajectory. Accordingly, the pixel group can be selected on the basis of the input trajectory before the object moves largely. If the amount of movement and moving direction of the image within the input region is calculated using the pixel group thus selected, the amount of movement and moving direction thereof can be calculated according to the movement of the object. Accordingly, if the input region is corrected using the amount of movement and moving direction thus calculated, the target region can be properly determined.

Preferably, the movement calculation unit is configured to calculate the amount of movement and moving direction of the image within the input region concurrently with the input, and the correction unit is configured to correct the input region concurrently with the input.

According to the configuration, the input region can be corrected concurrently with the input by the user.

Preferably, the input data is data showing the trajectory input by the user across several pictures contained in the video content; and the correction unit is configured to correct the input region on the basis of a shape of the trajectory expressed by the input data after the input across the several pictures is completed, to thereby determine the target region.

According to the configuration, the input region can be corrected on the basis of the shape of the trajectory, and calculation of the amount of movement and moving direction of the image within the input region is unnecessary. Accordingly, calculation load can be reduced.

Preferably, the correction unit is configured to approximate the trajectory expressed by the input data to an ellipse, and determine a region in the vicinity of a point of intersection as the target region in a picture in which the point of intersection is input, the point of intersection being a point of intersection farthest from the start point of the trajectory among points of intersection between a long axis of the ellipse and the trajectory.

According to the configuration, the trajectory can be approximated to an ellipse, and the region in the vicinity of the point of intersection farthest from the start point can be determined in the picture in which the point of intersection farthest from the start point of the trajectory among the points of intersection between the long axis of the ellipse and the trajectory is input. Accordingly, the region in the vicinity of a position in which the trajectory for surrounding the object starts to be closed can be determined as the target region. Namely, because it is thought that the object exists in the position in which the trajectory starts to be closed, the target region containing the object can be properly determined.

Preferably, the correction unit is configured to complement the trajectory expressed by the input data, to thereby determine the target region.

According to the configuration, the trajectory input by the user can be complemented to thereby determine the target region.

Accordingly, the target region can be properly determined before the object moves largely.

Preferably, the correction unit is configured to approximate the trajectory expressed by the input data to an ellipse, to thereby complement the trajectory.

According to the configuration, the trajectory input by the user can be approximated to an ellipse to thereby complement the trajectory. In the case where the user inputs a trajectory in order to surround a moving object, the shape of the trajectory is usually likely to be elliptical. Moreover, if the shape of the trajectory is elliptical, approximation can be performed at the relatively small number of points. Accordingly, the trajectory input by the user can be approximated to an ellipse to thereby properly determine the target region.

Preferably, the correction unit is configured to determine an algorithm for determining the target region on the basis of the input data, and correct the input region according to the determined algorithm, to thereby determine the target region.

According to the configuration, the algorithm for determining the target region can be properly determined on the basis of the input data, and the target region can be more properly determined.

Moreover, the data processing apparatus may be configured as an integrated circuit.

The present invention can be achieved as such a data processing apparatus, but also as a data processing method including operations of the characteristic components included in such a data processing apparatus as processings. Alternatively, the present invention can be achieved as a computer program causing a computer to execute each of the characteristic processings included in the data processing method. Such a computer program can be distributed through a non-temporary computer readable recording medium such as a CD-ROM (Compact Disc Read Only Memory) and a communicating medium such as the Internet.

Advantageous Effects of Invention

According to the present invention, on the basis of a trajectory input by a user in order to surround a moving object in a video content, a target region within a picture contained in a video content can be properly determined.

BRIEF DESCRIPTION OF DRAWINGS

FIG. 30 is a drawing showing an example of a trajectory expressed by input data in Embodiment 3 according to the present invention.

FIG. 31 is a flowchart showing a detailed processing flow of a correction process in Embodiment 3 according to the present invention.

FIG. 32 is a drawing for illustrating a processing of selecting a picture for correcting an input region in Embodiment 3 according to the present invention.

FIG. 34 is a block diagram showing a functional configuration of a data processing apparatus according to Embodiment 4 of the present invention.

DESCRIPTION OF EMBODIMENTS

Hereinafter, embodiments according to the present invention will be described with reference to the drawings.

Embodiment 1

A data processing apparatus 100 according to Embodiment 1 of the present invention determines a target region within a picture contained in a video content on the basis of a trajectory input by a user in order to surround a moving object in the video content. Particularly, in the present embodiment, after the user completes the input, the data processing apparatus 100 corrects the input region using the amount of movement and moving direction of an image within an input region, which is a region specified by the input trajectory, to thereby determine a target region.

The picture contained in the video content means one of pictures that form the video. The image within the input region means an image formed by pixels contained in the input region, which is a region within the picture. The object means an object presented in the video content (for example, people, animals, vehicles, and marks).

Hereinafter, the data processing apparatus according to Embodiment 1 of the present invention will be described with reference to the drawings.

Figure 1:
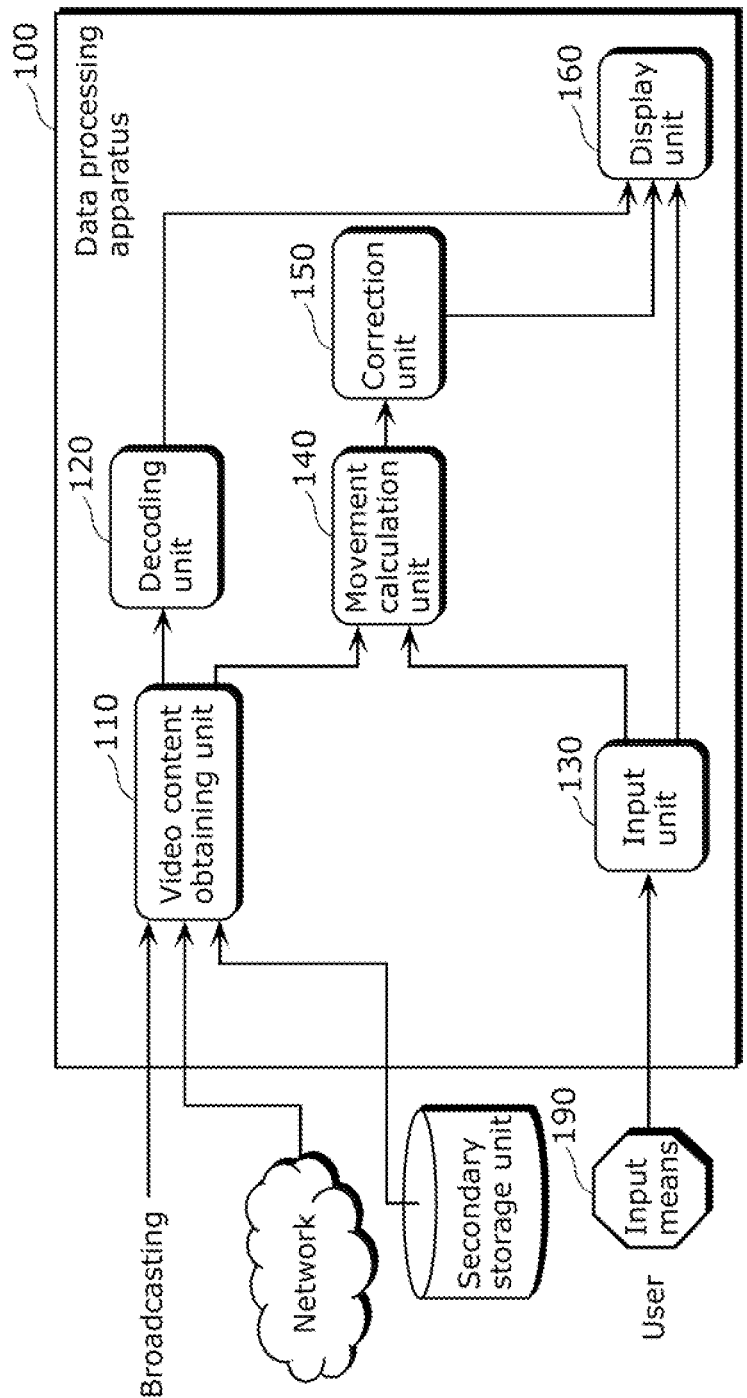
FIG. 1 is a block diagram showing a functional configuration of a data processing apparatus according to Embodiment 1 of the present invention.

FIG. 1 is a block diagram showing the functional configuration of the data processing apparatus 100 according to Embodiment 1 of the present invention.

[Internal Configuration of Data Processing Apparatus]

The data processing apparatus 100 includes a video content obtaining unit 110, a decoding unit 120, a display unit 160, a movement calculation unit 140, a correction unit 150, and an input unit 130.

An input means 190 is a specific input means with which the user inputs the target region into the data processing apparatus 100, such as a remote control, a mouse, or a keyboard. In the case where the data processing apparatus 100 includes a touch screen, the input means 190 may be a stylus such as a touch pen, or a finger of the user. The input means 190 may be an apparatus that enables operation by a gesture or voice.

The video content obtaining unit 110 obtains a video content to be viewed by the user from broadcasting, a network, or a secondary storage unit, for example.

The decoding unit 120 decodes the video content obtained by the video content obtaining unit 110.

The input unit 130 receives the input data from the user via the input means 190. Specifically, the input unit 130 receives the input data showing the trajectory input by the user in the displayed video content. In the present embodiment, the input data is the data showing the trajectory input by the user across several pictures contained in the video content.

The movement calculation unit 140 calculates the amount of movement and moving direction of the image within the input region. Namely, the movement calculation unit 140 calculates the amount of movement and moving direction of the image within the input region. In the present embodiment, the movement calculation unit 140 calculates the amount of movement and moving direction of the pixel group contained in the input region, to thereby calculate the amount of movement and moving direction of the image within the input region. A method for calculating the amount of movement and moving direction will be described in detail later.

The input region is a region specified by the trajectory expressed by the input data. In the present embodiment, the input region is a region surrounded by the trajectory expressed by the input data. The pixel group means a group of pixels composed of a predetermined number of pixels.

The correction unit 150 corrects the input region using the amount of movement and moving direction of the image within the input region calculated by the movement calculation unit 140, to thereby determine the target region. Then, the correction unit 150 outputs the thus-determined target region to the display unit 160. Alternatively, the correction unit 150 may output the thus-determined target region to an external picture retrieving apparatus, for example. A method for correcting the input region will be described in detail later.

The display unit 160 displays the video content decoded by the decoding unit 120 and the trajectory expressed by the input data and received by the input unit 130. Further, the display unit displays the information showing the target region determined by the correction unit 150.

[Whole Operation of Data Processing Apparatus]

Next, a variety of operations in the thus-configured data processing apparatus 100 will be described.

Figure 2:
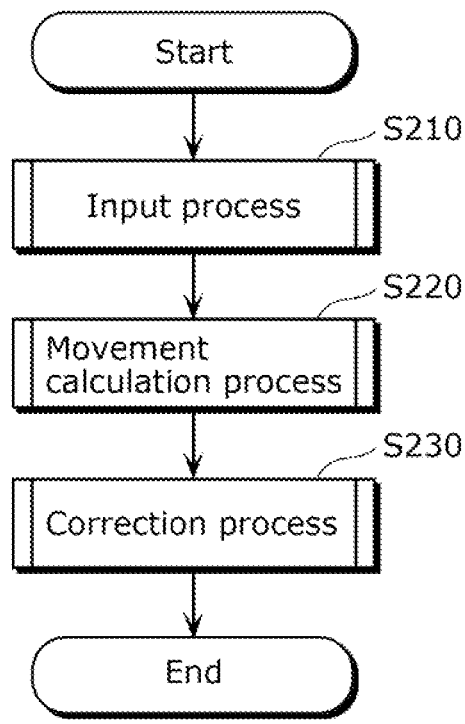
FIG. 2 is a flowchart showing a flow of a whole processing by the data processing apparatus in Embodiment 1 according to the present invention.

FIG. 2 is a flowchart showing a flow of a whole processing by the data processing apparatus 100 according to Embodiment 1 of the present invention. The data processing apparatus 100 executes an input process of receiving the input data (Step S210), a movement calculation process of calculating the amount of movement and moving direction of the pixel group within the input region (Step S220), and a correction process of correcting the input region (Step S230).

[Input Process]

Figure 3:
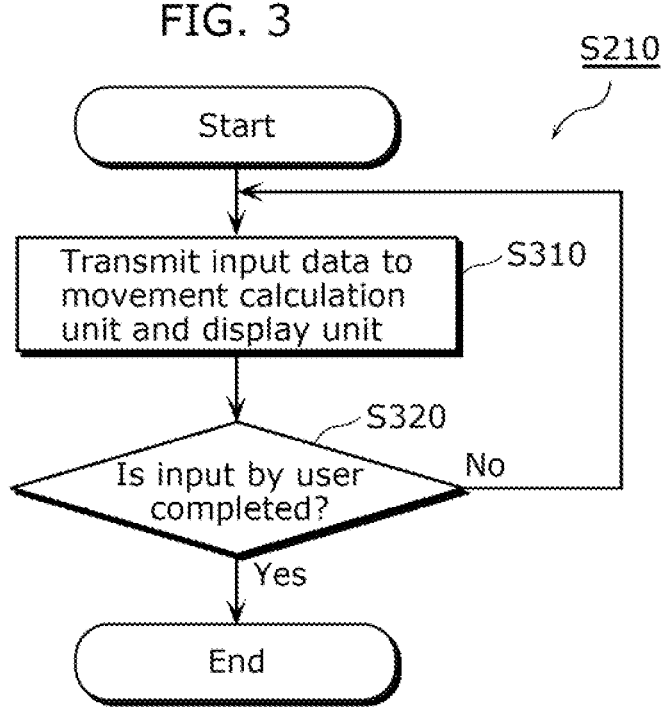
FIG. 3 is a flowchart showing a detailed processing flow of an input process in Embodiment 1 according to the present invention.

First, the input process (Step S210) will be described in detail. FIG. 3 is a flowchart showing a detailed processing flow of the input process (Step S210) in Embodiment 1 of the present invention.

When the user starts input of the trajectory using the input means 190, the input unit 130 of the data processing apparatus 100 receives the input data showing the input trajectory. Subsequently, the input unit 130 transmits the received input data to the movement calculation unit 140 and to the display unit 160 (Step S310). While the user continues the input, the input unit 130 continuously transmits the input data to the movement calculation unit 140 and to the display unit 160 (Step S320). The display unit 160 displays the received input data as it is with the input data being overlaid on the video content.

Figure 4:
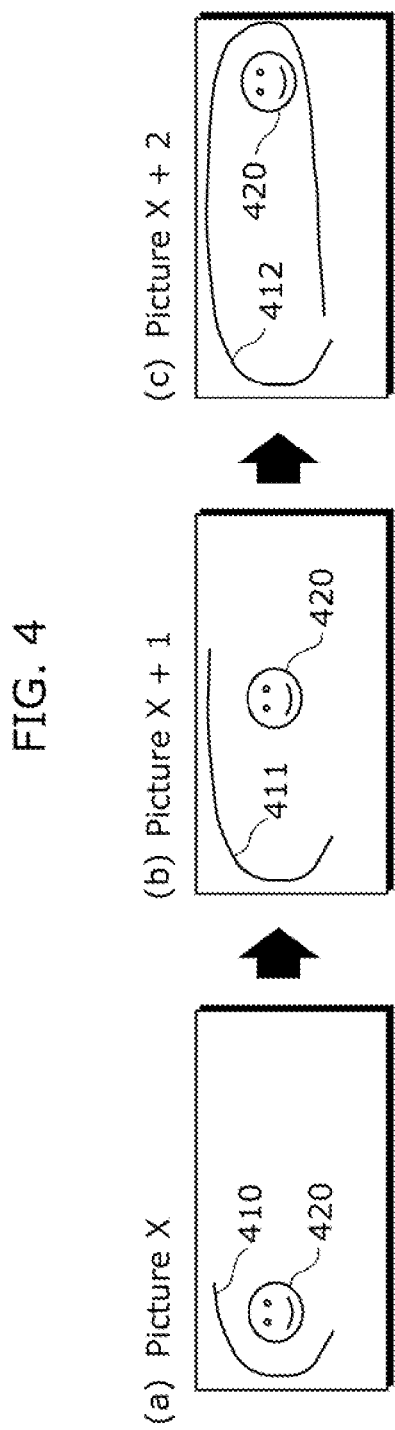
FIG. 4 is a drawing showing an example of a trajectory expressed by input data in Embodiment 1 according to the present invention.

FIG. 4 is a drawing showing an example of a trajectory expressed by the input data in Embodiment 1 according to the present invention. Specifically, FIG. 4 is a drawing showing an example of a process in which the user inputs the trajectory across several pictures in order to surround the moving object in the video content.

In the three pictures (pictures X, X+1, and X+2) contained in the video content, the object 420 moves from left to right in the horizontal direction. The user inputs the trajectories 410, 411, and 412 so as to surround the object 420. Finally, following the movement of the object, the user unintendedly inputs an elliptical trajectory 412 that encircles a region considerably larger than the object.

[Movement Calculation Process]

Figure 5:
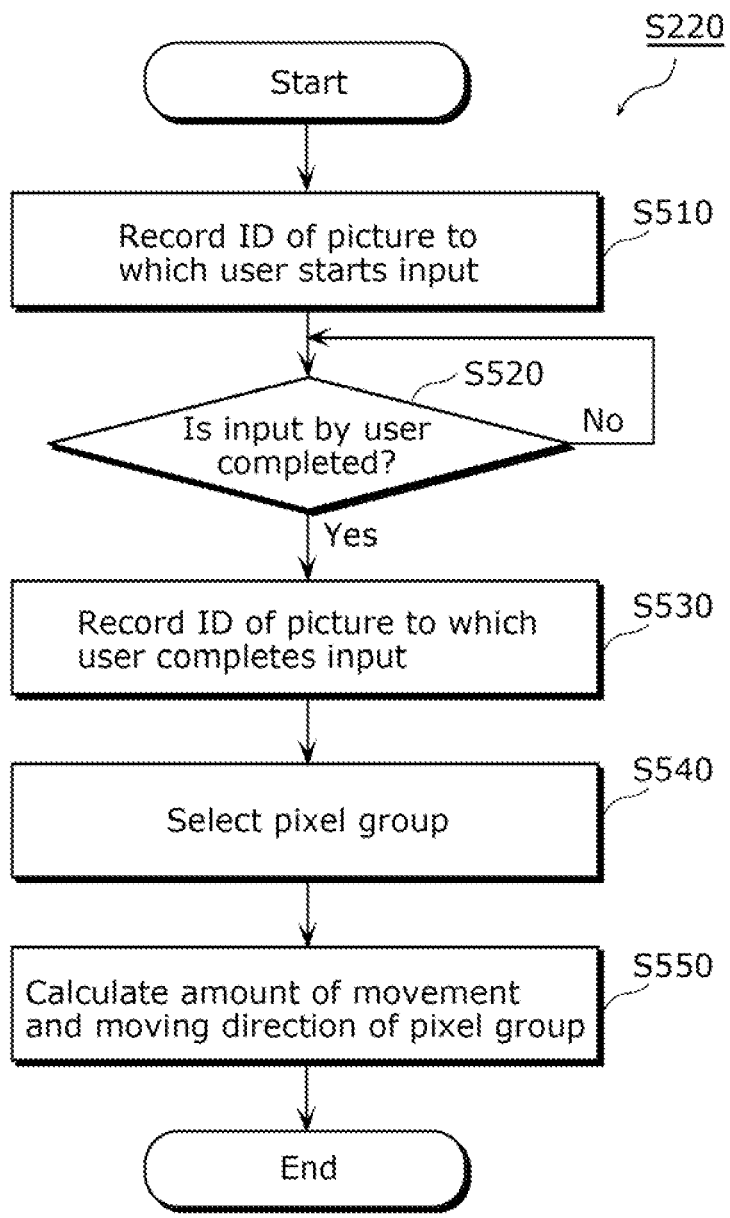
FIG. 5 is a flowchart showing a detailed processing flow of a movement calculation process in Embodiment 1 according to the present invention.

Next, the movement calculation process (Step S220) will be described in detail. FIG. 5 is a flowchart showing a detailed processing flow of the movement calculation process (Step S220) in Embodiment 1 of the present invention.

[Recording Picture when Input is Started/Completed]

When the movement calculation unit 140 starts receiving the input data from the input unit 130, the movement calculation unit 140 refers to the video content received from the video content obtaining unit 110 concurrently, and records the ID of the picture displayed at a timing when the user starts the input (hereinafter, referred to as the "initial picture") (Step S510). Next, when the movement calculation unit 140 completes receiving the input data from the input unit 130 (Step S520), the movement calculation unit 140 refers to the video content received from the video content obtaining unit 110 concurrently, and records the ID of the picture displayed at a timing when the user completes the input (hereinafter, referred to as the "final picture") (Step S530).

[Selection of Pixel Group]

Next, the movement calculation unit 140 selects the pixel group for calculating the amount of movement and moving direction of the image within the input region (Step S540).

Specifically, the movement calculation unit 140 specifies the input region on the basis of the trajectory expressed by the input data. Here, as the input region, the movement calculation unit 140 specifies the region surrounded by the trajectory expressed by the input data. Moreover, the movement calculation unit 140 selects the pixel group contained in the input region in all the pictures from the initial picture to the final picture. Here, the pixel group contained in the input region includes a pixel group in which at least part of the pixels thereof is contained in the input region.

Figure 6:
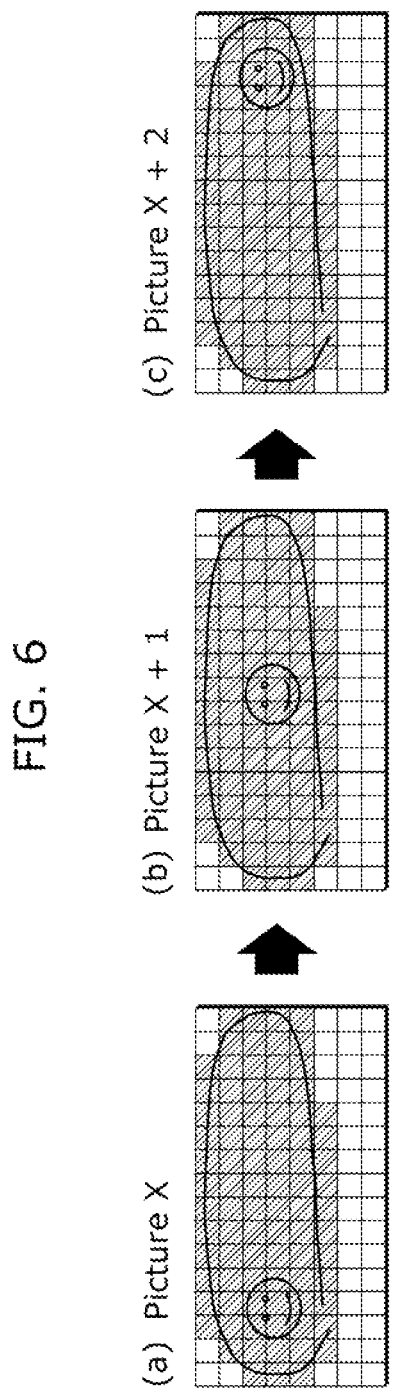
FIG. 6 is a drawing for illustrating a pixel group to be selected in Embodiment 1 according to the present invention.

FIG. 6 is a drawing for illustrating a pixel group to be selected in Embodiment 1 of the present invention. As shown in FIG. 6, in each of the pictures X, X+1, and X+2, the movement calculation unit 140 selects the pixel group even part of which is contained in the input region (the hatched pixel group) from a plurality of pixel groups contained in the picture.

[Calculation of Amount of Movement and Moving Direction]

Next, the movement calculation unit 140 calculates the amount of movement and moving direction of the pixel group selected in Step S540, to thereby calculate the amount of movement and moving direction of the image within the input region (Step S550).

The amount of movement and moving direction of the pixel group selected in a picture is calculated as a relative amount of movement and moving direction with respect to the picture immediately before the picture. Accordingly, for example, in the case where the trajectory is input in the pictures N to N+m, the amount of movement and moving direction of the pixel group is calculated in the pictures N+1 to N+m.

For example, the amount of movement and moving direction of the pixel group to be calculated in FIG. 6 is the amount of movement and moving direction between the picture X+1 and the picture X and the amount of movement and moving direction between the picture X+2 and the picture X+1.

Figure 7:
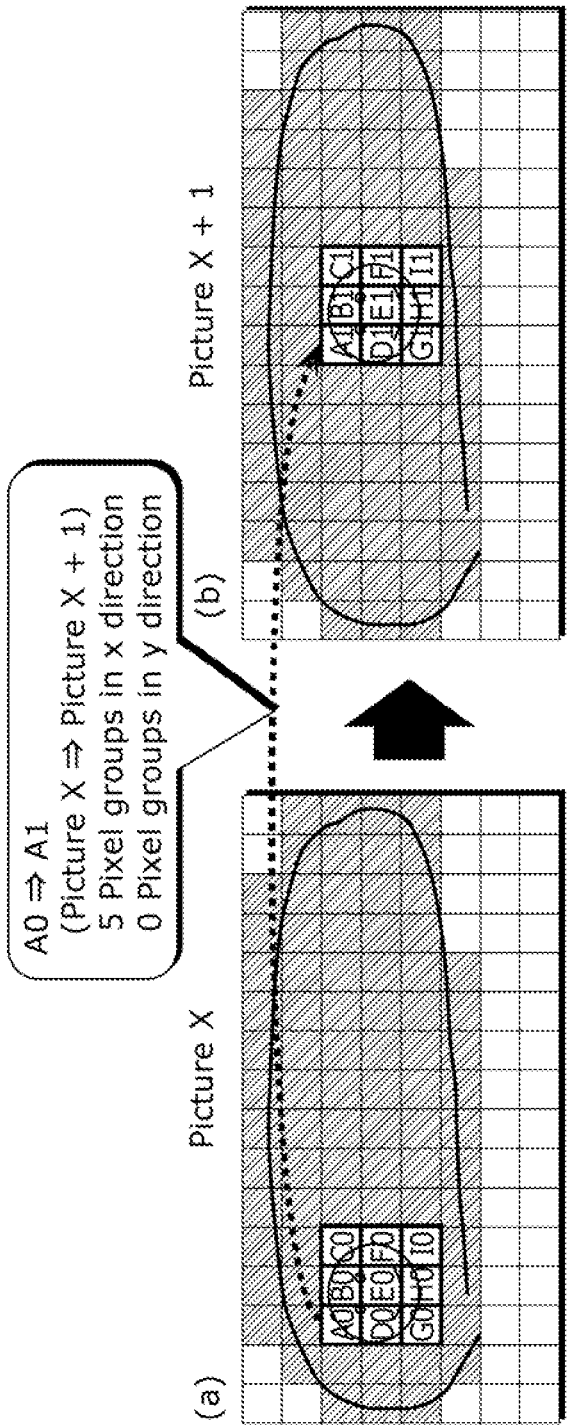
FIG. 7 is a drawing showing an example of a result of calculation of an amount of movement and moving direction of the pixel group in Embodiment 1 according to the present invention.

FIG. 7 is a drawing showing an example of a result of calculation of the amount of movement and moving direction of the pixel group in Embodiment 1 according to the present invention. Only pixel groups A to I move in the pictures X and X+1. For example, the pixel group A0 in the picture X moves to the pixel group A1 in the picture X+1. Accordingly, the amount of movement and moving direction of the pixel group A1 to the pixel group A0 is 5 pixel groups in the x direction and 0 pixel groups in the y direction. Similarly, the amounts of movement and moving directions of the pixel groups B1 to I1 to the pixel groups B0 to I0, respectively, are 5 pixel groups in the x direction and 0 pixel groups in the y direction. The amount of movement of other pixel groups is 0.

Figure 8:
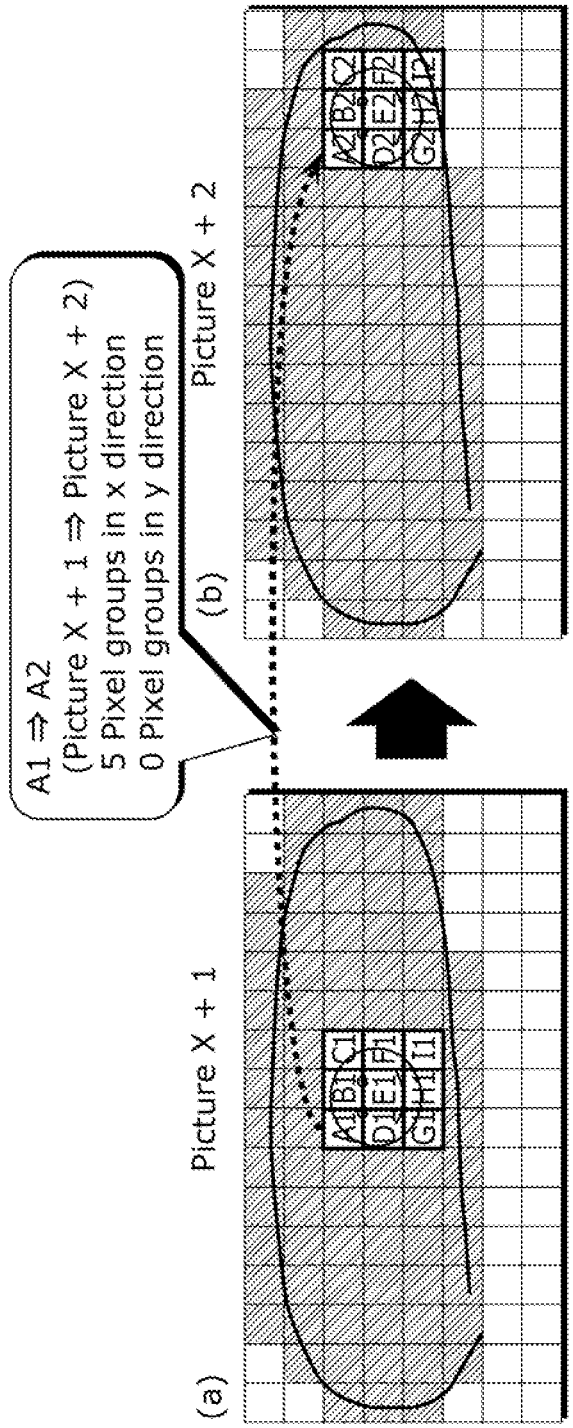
FIG. 8 is a drawing showing an example of a result of calculation of an amount of movement and moving direction of the pixel group in Embodiment 1 according to the present invention.

FIG. 8 is a drawing showing an example of a result of calculation of an amount of movement and moving direction of the pixel group in Embodiment 1 according to the present invention. Similarly to the case of the amount of movement and moving direction in the picture X+1 relative to the picture X, the amounts of movement and moving directions of the pixel groups A2 to I2 to the pixel groups A1 to I1, respectively, are 5 pixel groups in the x direction and 0 pixel groups in the y direction. The amount of movement of other pixel groups is 0.

The movement calculation unit 140 calculates the averages of the thus-calculated amounts of movement and moving directions of the pixel groups for each of the pictures. Moreover, the movement calculation unit 140 sums the averages calculated for the respective pictures as the amount of movement and moving direction of the image within the input region in the pictures X to X+2.

Here, a method for calculating the averages of the amounts of movement and moving directions of the pixel groups for each of the pictures and summing the averages will be described in detail.

First, the movement calculation unit 140 calculates the averages of the amounts of movement and moving directions of the pixel groups for each of the pictures. At this time, the movement calculation unit 140 neglects the pixel groups not moved, and derives the averages. Namely, the movement calculation unit 140 calculates the averages of the amounts of movement and moving directions of the pixel groups whose amount of movement is greater than 0 for each of the pictures.

Next, the movement calculation unit 140 sums the averages calculated for the respective pictures as the amount of movement and moving direction of the image within the input region. For example, in FIG. 7 and FIG. 8, the amount of movement and moving direction of the image within the input region is calculated as follows.

Average in the picture X+1=(amount of movement and moving direction of the pixel group A1 (5,0)+amount of movement and moving direction of the pixel group B1 (5,0)+amount of movement and moving direction of the pixel group C1 (5,0)+amount of movement and moving direction of the pixel group D1 (5,0)+amount of movement and moving direction of the pixel group E1 (5,0)+amount of movement and moving direction of the pixel group F1 (5,0)+amount of movement and moving direction of the pixel group G1 (5,0)+amount of movement and moving direction of the pixel group H1 (5,0)+amount of movement and moving direction of the pixel group I1. (5,0))/9=(5,0)

Average in the picture X+2=(amount of movement and moving direction of the pixel group A2 (5,0)+amount of movement and moving direction of the pixel group B2 (5,0)+amount of movement and moving direction of the pixel group C2 (5,0)+amount of movement and moving direction of the pixel group D2 (5,0)+amount of movement and moving direction of the pixel group E2 (5,0)+amount of movement and moving direction of the pixel group F2 (5,0)+amount of movement and moving direction of the pixel group G2 (5,0)+amount of movement and moving direction of the pixel group H2 (5,0)+amount of movement and moving direction of the pixel group I2 (5,0))/9=(5,0)

Amount of movement and moving direction of the image within the input region=average in the picture X+1 (5,0)+average in the picture X+2 (5,0)=(10,0)

The movement calculation unit 140 does not always need to calculate the amount of movement and moving direction of the image within the input region by the method as described above. For example, the movement calculation unit 140 may calculate the sum of the averages of the amounts of movement and moving directions of all the pixel groups (including the pixel groups not moved) contained in the input region as the amount of movement and moving direction of the image within the input region.

[Correction Process]

Next, the correction process. (Step S230) will be described in detail. As the target region, the correction unit 150 determines the intersection of a region after movement obtained by moving the input region according to the calculated amount of movement and moving direction and the input region. Specifically, the correction unit 150 moves the input region by the amount of movement in the moving direction on the final picture of the several pictures to which the trajectory is input. Subsequently, the correction unit 150 determines the intersection of the region before movement and that after movement as the target region.

Figure 9:
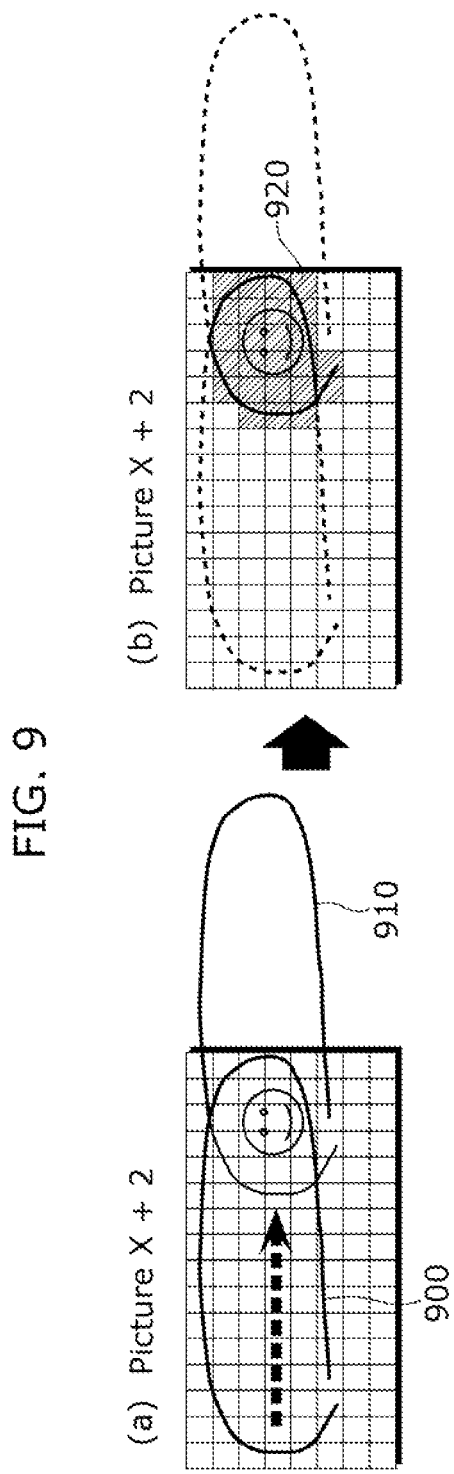
FIG. 9 is a drawing for illustrating a correction processing on the input region performed by a correction unit in Embodiment 1 according to the present invention.

FIG. 9 is a drawing for illustrating a correction processing on the input region performed by the correction unit 150 in Embodiment 1 according to the present invention. The correction unit 150 calculates the region after movement 910 obtained by moving the input region 900 in the calculated moving direction by the calculated amount of movement, i.e., in the x direction by 10 pixel groups. Next, the correction unit 150 determines the intersection of the input region 900 and the region after movement 910 as the target region 920.

As above, the data processing apparatus 100 according to the present embodiment can correct the input region specified by the trajectory input by the user in order to surround the object, to thereby obtain the target region that the user originally intended to surround.

The data processing apparatus 100 according to the present embodiment can also correct the input region using the amount of movement and moving direction of the image within the input region. Usually, the input region contains the object that the user intends to surround. Accordingly, the data processing apparatus 100 can correct the input region according to the movement of the object. Thereby, even if the movement of the object causes the input of the trajectory to be out of order, the input region can be corrected using the movement, and the target region can be properly determined. Namely, the region that the user intends to surround, i.e., the region containing the object can be determined as the target region.

Further, according to the amount of movement and moving direction of the image within the input region, as the target region, the data processing apparatus 100 according to the present embodiment can determine the intersection of the region after movement obtained by moving the input region and the input region. Accordingly, even if the input region becomes larger than necessary because the user follows the movement of the object, the region that contains the object and is smaller than the input region can be determined as the target region. As a result, the target region can be properly determined.

Moreover, if the target region thus determined is output to a picture retrieving apparatus or the like, the picture content related to the object that the user intends to designate (a still picture content or a video content) can be efficiently retrieved.

Next, modifications of Embodiment 1 will be described below. In the description of each modification below, differences from Embodiment 1 will be mainly described, and the illustration and description of similarities to Embodiment 1 will be properly omitted.

(Modification 1 of Embodiment 1)

Figure 10:
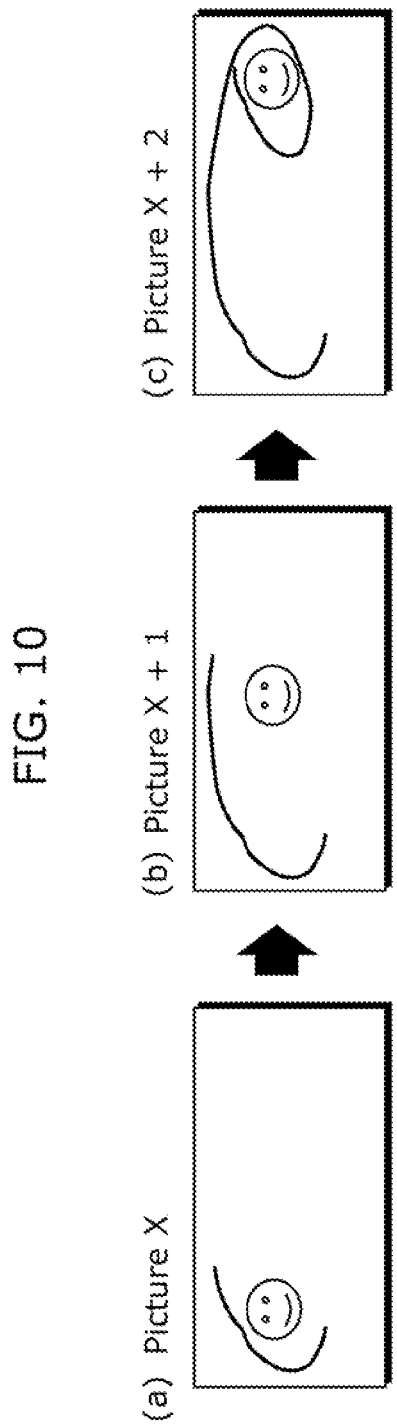
FIG. 10 is a drawing showing an example of a trajectory expressed by input data in Modification 1 of Embodiment 1 according to the present invention.

Unlike Embodiment 1, Modification 1 of Embodiment 1 includes other processing of specifying the input region from the input trajectory and selecting the pixel group contained in the input region. At the time of inputting the trajectory using the input means 190, the user does not always input the elliptical trajectory as shown in FIG. 4. For example, it is thought that the trajectory as shown in FIG. 10 may be input. Accordingly, in the present modification, the movement calculation unit 140 approximates the trajectory expressed by the input data to an ellipse, and specifies the region surrounded by the ellipse as the input region. Hereinafter, the data processing apparatus according to the present modification will be described with reference to the drawings.

FIG. 10 is a drawing showing an example of a trajectory expressed by the input data in Modification 1 of Embodiment 1 according to the present invention. Specifically, FIG. 10 is a drawing showing other example of a process to which the user inputs the trajectory across several pictures so as to surround the moving object in the video content.

In the three pictures (pictures X, X+1, and X+2) contained in the video content, the object moves from left to right in the horizontal direction in the same manner as in the case of FIG. 4. Initially, the user inputs the trajectory following the movement of the object. Finally, however, the user inputs the trajectory that encircles the object in the picture X+2. In this case, the movement calculation unit 140 has difficulties to specify the input region from the trajectory expressed by the input data in a simple manner.

Accordingly, the movement calculation unit 140 approximates the trajectory expressed by the input data to an ellipse so as to surround the entire trajectory expressed by the input data, and specifies the region surrounded by the ellipse as the input region. The movement calculation unit 140 may approximate the trajectory to an ellipse using an ordinary method such as the least squares method.

Figure 11:
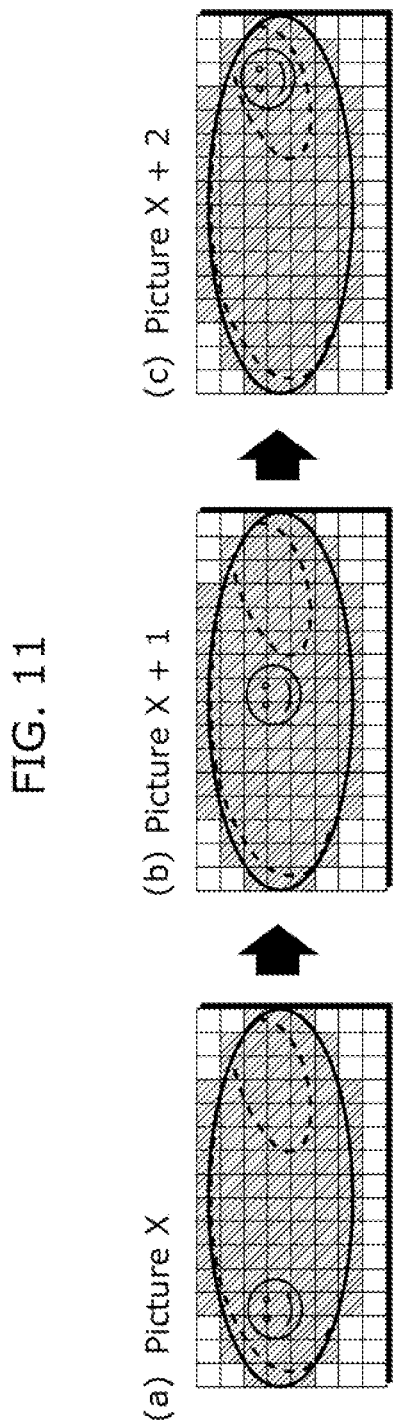
FIG. 11 is a drawing showing an example of a pixel group to be selected in Modification 1 of Embodiment 1 according to the present invention.

FIG. 11 is a drawing showing an example of a pixel group to be selected in Modification 1 of Embodiment 1 according to the present invention. In the present modification, as shown in FIG. 11, from a plurality of pixel groups contained in the picture, the movement calculation unit 140 selects the pixel group contained in the input region surrounded by the ellipse obtained by approximating the trajectory input by the user.

As above, the data processing apparatus 100 according to the present modification can properly determine the target region even if the trajectory input by the user is not an ellipse.

(Modification 2 of Embodiment 1)

Unlike Embodiment 1, Modification 2 of Embodiment 1 also includes other processing of specifying the input region from the input trajectory and selecting the pixel group contained in the input region, as well as in Modification 1 above. Specifically, in the present modification, as the input region, the movement calculation unit 140 specifies the rectangular region containing the trajectory expressed by the input data. Hereinafter, the data processing apparatus in the present modification will be described with reference to the drawings.

Figure 12:
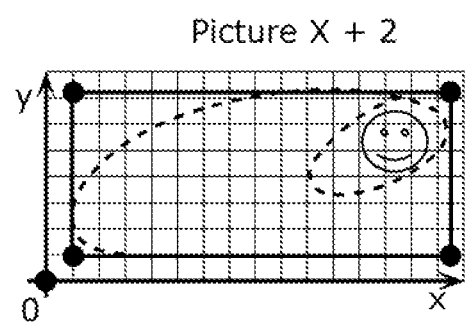
FIG. 12 is a drawing showing an example of an input region specified in Modification 2 of Embodiment 1 according to the present invention.

FIG. 12 is a drawing showing an example of an input region specified in Modification 2 of Embodiment 1 according to the present invention. As in FIG. 12, in the case where a coordinate frame is set in the picture, the movement calculation unit 140 calculates the minimum value and maximum value in the x coordinate and the minimum value and maximum value in the y coordinate in the trajectory expressed by the input data. As the input region, the movement calculation unit 140 specifies the rectangular region having four vertices in combination of the minimum value and maximum value in the x coordinate and the minimum value and maximum value in the y coordinate thus calculated.

Figure 13:
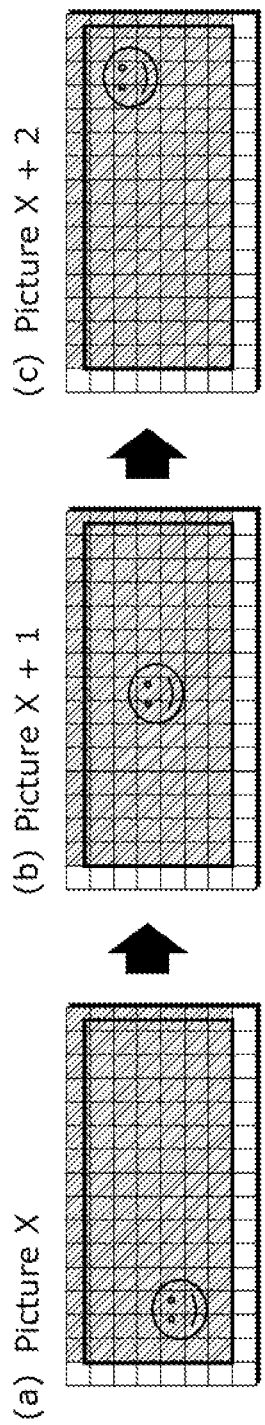
FIG. 13 is a drawing showing an example of a pixel group to be selected in Modification 2 of Embodiment 1 according to the present invention.

FIG. 13 is a drawing showing an example of a pixel group to be selected in Modification 2 of Embodiment 1 according to the present invention. In the present modification, as shown in FIG. 13, from a plurality of pixel groups contained in the picture, the movement calculation unit 140 selects the pixel group contained in the rectangular input region specified by the trajectory input by the user.

As above, the data processing apparatus 100 according to the present modification can properly determine the target region even if the input region is not elliptical.

(Modification 3 of Embodiment 1)

Unlike Embodiment 1, Modification 3 of Embodiment 1 includes other processing of selecting the pixel group in order to calculate the amount of movement and moving direction of the image within the input region. Specifically, in the present modification, on the basis of the input trajectory, the movement calculation unit 140 selects at least one pixel group in at least initial one picture among several pictures to which a trajectory is input. Hereinafter, the data processing apparatus according to the present modification will be described with reference to the drawings.

Figure 14:
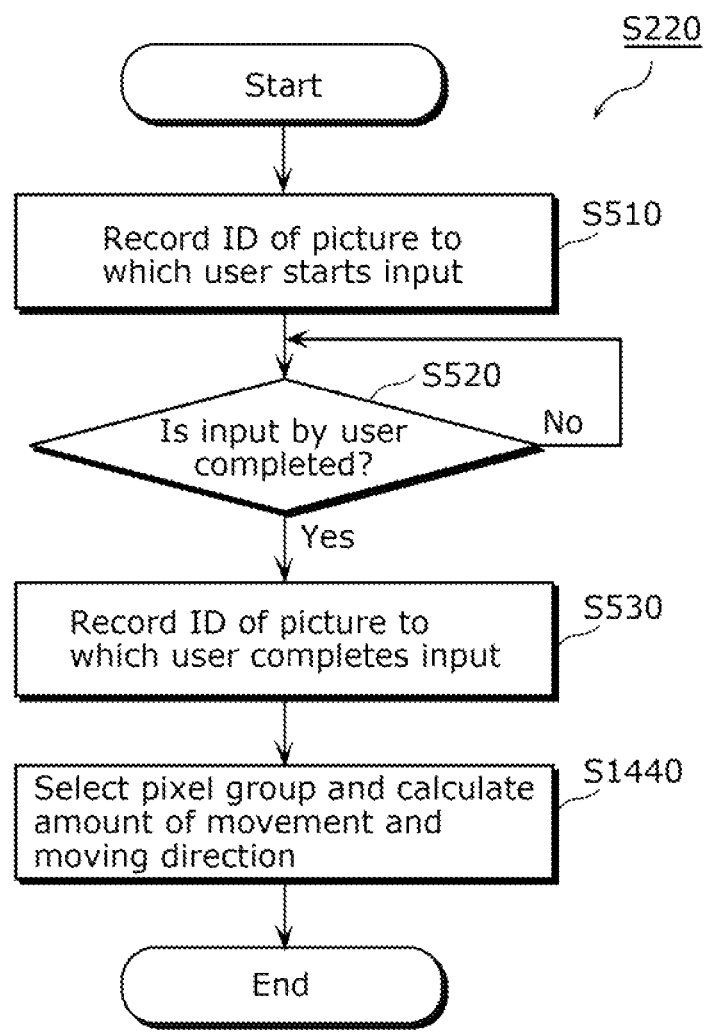
FIG. 14 is a flowchart showing a detailed processing flow of a movement calculation process in Modification 3 of Embodiment 1 according to the present invention.

FIG. 14 is a flowchart showing a detailed processing flow of a movement calculation process in Modification 3 of Embodiment 1 according to the present invention. In FIG. 14, same reference numerals will be given to the same processings as those in FIG. 5, and the description thereof will be omitted.

On the basis of the input trajectory, the movement calculation unit 140 selects at least one pixel group in at least initial one picture among several pictures to which the trajectory is input (S1440). The specific example thereof will be described in detail using FIG. 15 to FIG. 17.

Figure 15:
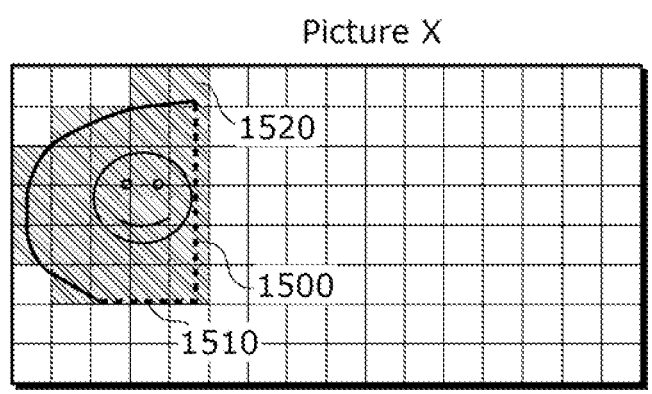
FIG. 15 is a drawing showing an example of a pixel group to be selected in Modification 3 of Embodiment 1 according to the present invention.

FIG. 15 is a drawing showing an example of a pixel group to be selected in Modification 3 of Embodiment 1 according to the present invention. Specifically, FIG. 15 shows a pixel group selected in the initial picture X among the pictures X to X+2 to which the trajectory is input.

Figure 16:
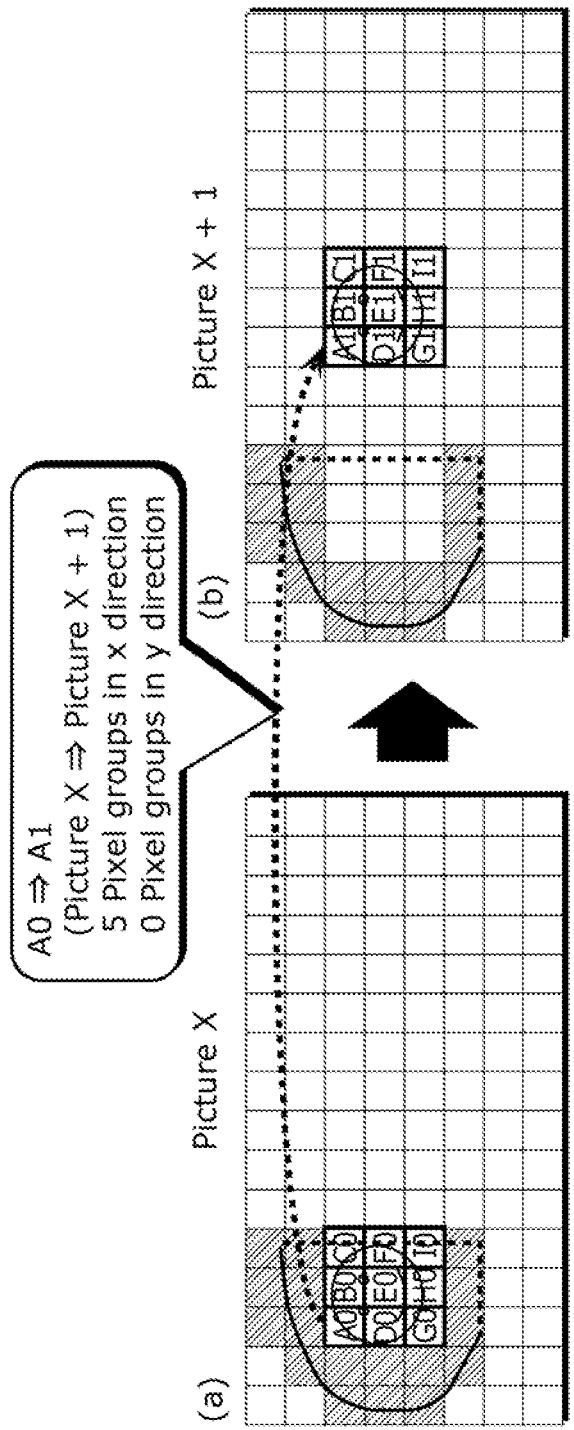
FIG. 16 is a drawing showing an example of a result of calculation of an amount of movement and moving direction of the pixel group in Modification 3 of Embodiment 1 according to the present invention.
Figure 17:
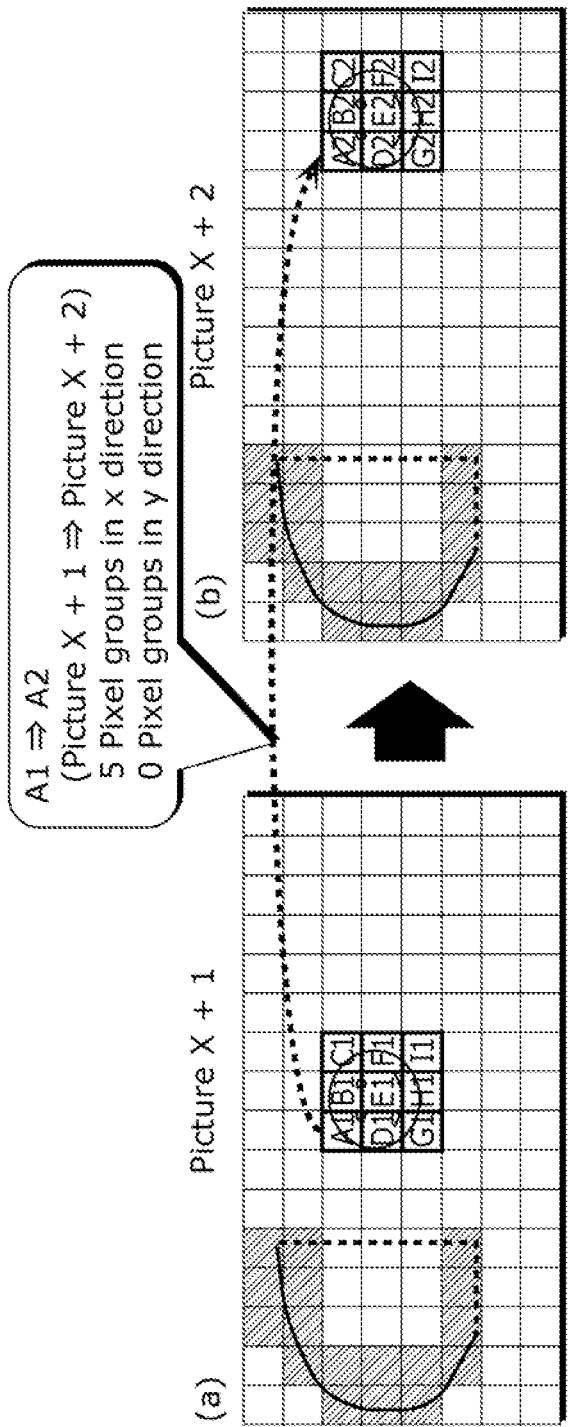
FIG. 17 is a drawing showing an example of a result of calculation of an amount of movement and moving direction of the pixel group in Modification 3 of Embodiment 1 according to the present invention.

As shown in FIG. 15, the trajectory input by the user in the picture X is a half input trajectory, and does not form a closed region. Accordingly, the movement calculation unit 140 selects pixel groups 1520 contained in a region surrounded by a line segment 1500 extending from one end point of the input trajectory in the vertical direction, a line segment 1510 extending from the other end point of the input trajectory in the horizontal direction, and the input trajectory. As shown in FIG. 16 and FIG. 17, the movement calculation unit 140 calculates the amounts of movement and moving directions of the thus-selected pixel groups 1520 in the pictures X to X+2 as the amount of movement and moving direction of the image within the input region.

The movement calculation unit 140 does not always need to select the pixel group in the initial one picture on the basis of the input trajectory. For example, the movement calculation unit 140 may select the pixel group in the initial two or more pictures on the basis of the input trajectory.

The movement calculation unit 140 does not always need to calculate the amount of movement and moving direction of the pixel group as described above. For example, the movement calculation unit 140 may calculate a "motion vector" in a macroblock (8×8 pixels) unit using a picture compression method such as the Moving Picture Experts Group (MPEG) as the amount of movement and moving direction of the pixel group of 8×8 pixels.

As above, the data processing apparatus 100 according to the present modification can select at least one pixel group in at least initial one picture among several pictures on the basis of the input trajectory. Accordingly, the pixel group can be selected on the basis of the input trajectory before the object moves largely. If the amount of movement and moving direction of the image within the input region is calculated using the pixel group thus selected, the amount of movement and moving direction thereof can be calculated according to the movement of the object. Accordingly, if the input region is corrected using the amount of movement and moving direction of the image within the input region thus calculated, the target region can be properly determined.

(Modification 4 of Embodiment 1)

Unlike Embodiment 1, Modification 4 of Embodiment 1 includes other processing of correcting the input region to thereby determine the target region. Specifically, in the present modification, as the target region, the correction unit 150 determines the intersection of the region after movement obtained by moving the input region in the direction opposite to the moving direction of the image within the input region by the amount of movement and the input region in the initial picture among several pictures. Hereinafter, the data processing apparatus according to the present modification will be described with reference to the drawings.

Figure 18:
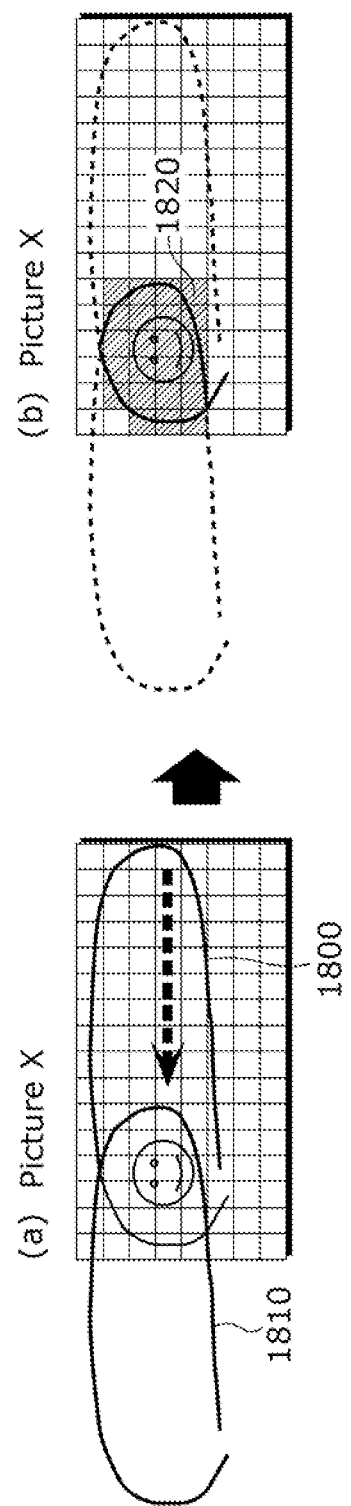
FIG. 18 is a drawing for illustrating a correction processing on an input region performed by a correction unit in Modification 4 of Embodiment 1 according to the present invention.

FIG. 18 is a drawing for illustrating a correction processing on the input region performed by the correction unit 150 in Modification 4 of Embodiment 1 according to the present invention. As shown in FIG. 18, the correction unit 150 calculates a region after movement 1810 obtained by moving an input region 1800 in the direction opposite to the calculated moving direction by the calculated amount of movement in the initial picture X. Next, the correction unit 150 determines the intersection of the input region 1800 and the region after movement 1810 as a target region 1820.

As above, the data processing apparatus 100 according to the present modification can provide the same effect as that in Embodiment 1.

(Modification 5 of Embodiment 1)

Unlike Embodiment 1, Modification 5 of Embodiment 1 includes other processing of correcting the input region to thereby determine the target region. Specifically, in the present modification, the correction unit 150 compresses the input region according to the amount of movement and moving direction of the image within the input region to thereby determine the target region. Hereinafter, the data processing apparatus according to the present modification will be described with reference to the drawings.

Figure 19:
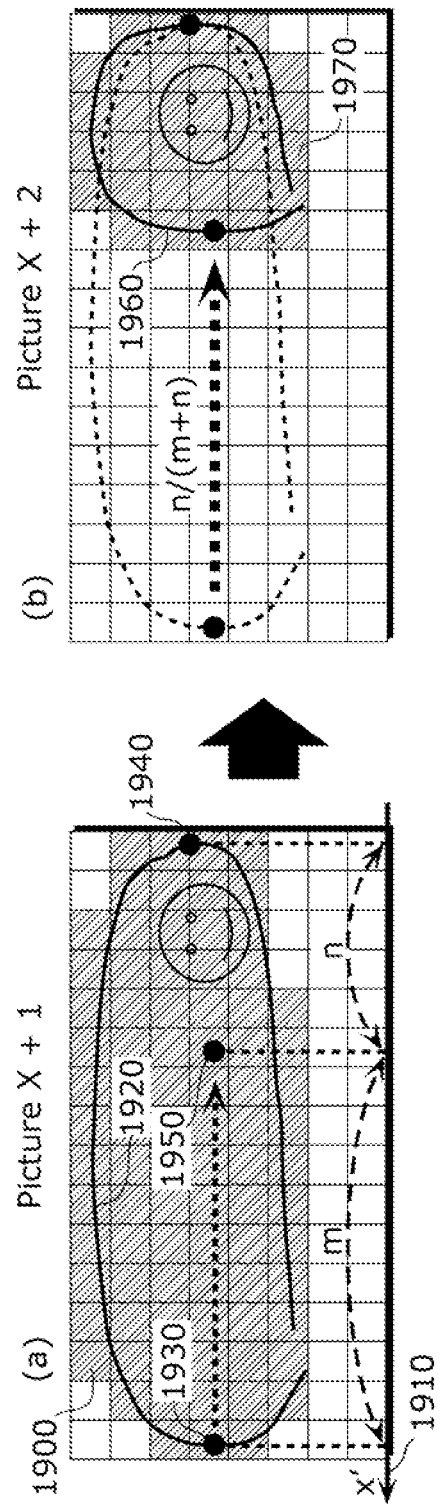
FIG. 19 is a drawing for illustrating a correction processing on an input region performed by a correction unit in Modification 5 of Embodiment 1 according to the present invention.

FIG. 19 is a drawing for illustrating a correction processing on the input region performed by the correction unit 150 in Modification 5 of Embodiment 1 according to the present invention. As shown in FIG. 19, the correction unit 150 compresses the input region according to the calculated amount of movement and moving direction to thereby determine the target region. Specifically, the correction unit 150 compresses the input region in the calculated moving direction by the calculated amount of movement to thereby determine the target region in the final picture among several pictures to which the user inputs the trajectory.

More specifically, first, the correction unit 150 sets an x'-axis 1910 parallel to the calculated moving direction in the final picture X+2. Next, among all the points that form a trajectory 1920 input by the user, the correction unit 150 specifies a point 1930 located at the leftmost on the x'-axis, a point 1940 located at the rightmost, and a point 1950 obtained by moving the point 1930 in the calculated moving direction by the calculated amount of movement. Next, the correction unit 150 calculates a distance m in the x'-axis direction between the point 1930 and the point 1950 and a distance n in the x'-axis direction between the point 1940 and the point 1950. Finally, wherein the x' coordinate of the point 1940 is 0, the correction unit 150 compresses the x' coordinate of the points except the point 1940 among all the points that form the trajectory 1920 to n/(m+n). Thereby, the trajectory 1920 input by the user is compressed into a trajectory 1960. Thus, the correction unit 150 compresses the input region 1900 to thereby determine the target region 1970.

As above, the data processing apparatus 100 according to the present modification can compress the input region according to the amount of movement and moving direction of the image within the input region to thereby determine the target region. Accordingly, even if the input region becomes larger than necessary because the user follows the movement of the object, the region that contains the object and is smaller than the input region can be determined as the target region. As a result, the target region can be properly determined.

In the present modification, the correction unit 150 determines the target region in the final picture among the several pictures to which the user inputs the trajectory. The correction unit 150, however, does not always to thereby determine the target region in the final picture. For example, the correction unit 150 may determine the target region in the picture immediately before the final picture. For example, the correction unit 150 may also specify the picture when the trajectory for surrounding the object starts to be closed, and determine the target region in the specified picture.

(Modification 6 of Embodiment 1)

Unlike Embodiment 1, Modification 6 of Embodiment 1 includes other processing of correcting the input region to thereby determine the target region as well as in Modification 5. Specifically, in the present modification, the correction unit 150 compresses the input region in the direction opposite to the moving direction by the amount of movement to thereby determine the target region in the initial picture among several pictures. Hereinafter, the data processing apparatus according to the present modification will be described with reference to the drawings.

Figure 20:
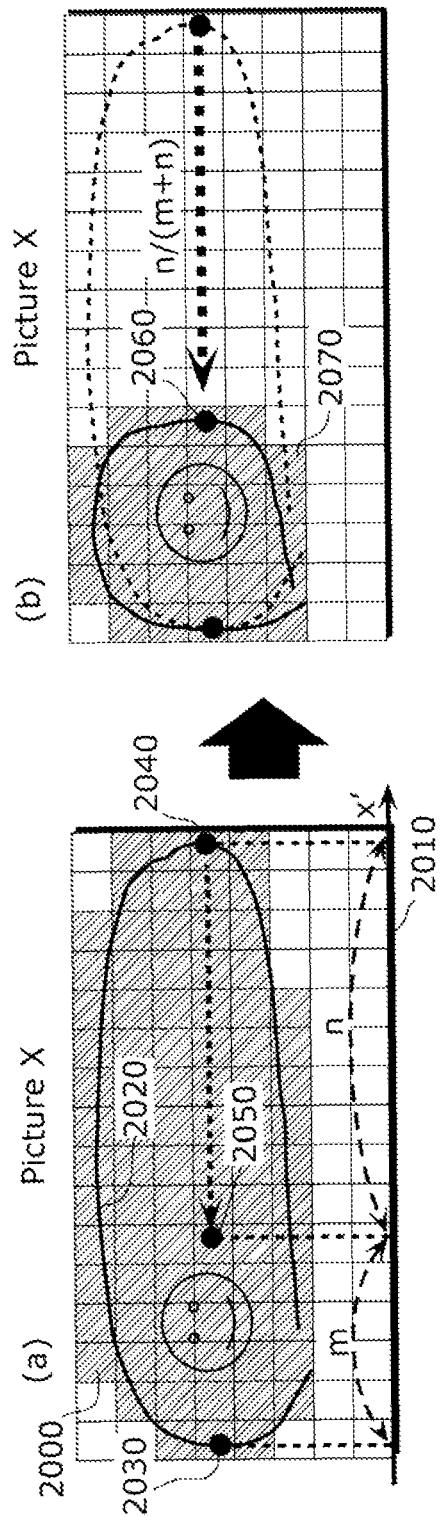
FIG. 20 is a drawing for illustrating a correction processing on an input region performed by a correction unit in Modification 6 of Embodiment 1 according to the present invention.

FIG. 20 is a drawing for illustrating a correction processing on the input region performed by the correction unit 150 in Modification 6 of Embodiment 1 according to the present invention. As shown in FIG. 20, the correction unit 150 compresses the input region in the direction opposite to the calculated moving direction by the calculated amount of movement to thereby determine the target region in the initial picture among the several pictures to which the user inputs the trajectory.

More specifically, first, the correction unit 150 sets an x'-axis 2010 parallel to the calculated moving direction in the initial picture X. Next, among all the points that form a trajectory 2020 input by the user, the correction unit 150 specifies a point 2030 located at the leftmost in the x'-axis, a point 2040 located at the rightmost, and a point 2050 obtained by moving the point 2040 in the direction opposite to the calculated moving direction by the calculated amount of movement. Next, the correction unit 150 calculates a distance m in the x'-axis direction between the point 2030 and the point 2050 and a distance n in the x'-axis direction between the point 2040 and the point 2050. Finally, wherein the x' coordinate of the point 2030 is 0, the correction unit 150 compresses the x' coordinate of the points except the point 2040 among all the points that form the trajectory 2020 to m/(m+n). Thereby, the trajectory 2020 input by the user is compressed into a trajectory 2060. Thus, the correction unit 150 compresses the input region 2000 to thereby determine the target region.

As above, the data processing apparatus 100 according to the present modification can provide the same effect as that in Modification 6.

(Modification 7 of Embodiment 1)

Unlike Embodiment 1, Modification 7 of Embodiment 1 includes other processing of correcting the input region to thereby determine the target region as well as in Modifications 5 and 6. In the present modification, the input region has a rectangular shape as in Modification 2. Hereinafter, the data processing apparatus according to the present modification will be described with reference to the drawings.

Figure 21:
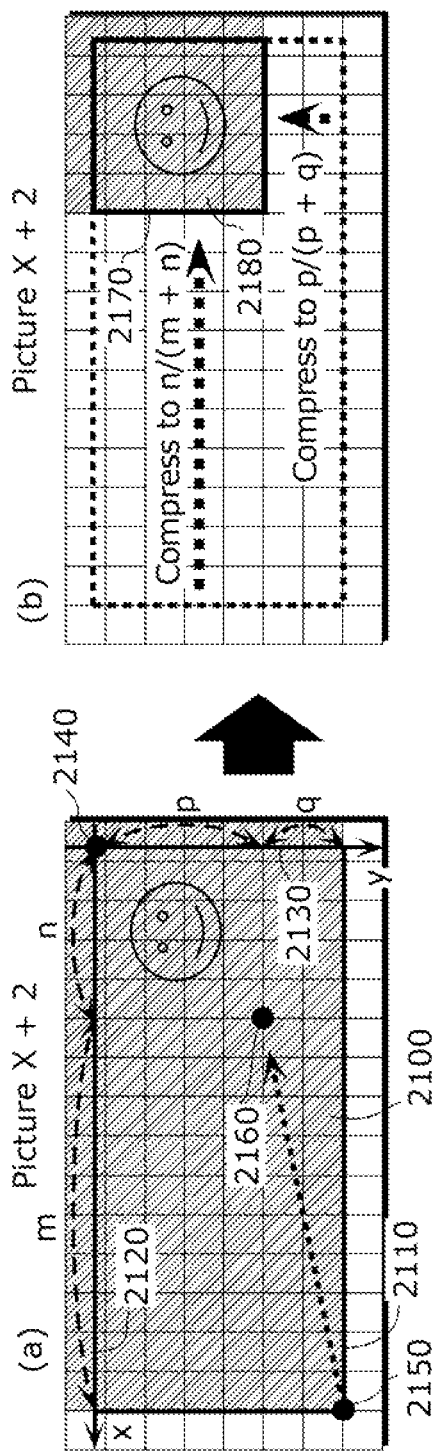
FIG. 21 is a drawing for illustrating a correction processing on an input region performed by a correction unit in Modification 7 of Embodiment 1 according to the present invention.

FIG. 21 is a drawing for illustrating a correction processing on the input region performed by the correction unit 150 in Modification 7 of Embodiment 1 according to the present invention. As shown in FIG. 21, the correction unit 150 compresses the input region in the calculated moving direction by the calculated amount of movement to thereby determine the target region in the initial picture among the pictures to which the user inputs the trajectory.

Specifically, first, the correction unit 150 sets the top side of the input region 2100 as an x-axis 2120, the right side thereof as a y-axis 2130, and a point of intersection 2140 between the top side and the right side as the origin in the final picture X+2. Next, the correction unit 150 specifies a point 2160 obtained by moving a vertex 2150 on the lower left of the input region 2100 in the calculated moving direction by the calculated amount of movement. Next, the correction unit 150 calculates a distance m in the x-axis direction between the point 2150 and the point 2160 and a distance n in the x-axis direction between the point 2150 and the point 2140. The correction unit 150 also calculates a distance q in the y-axis direction between the point 2150 and the point 2160 and a distance p in the y-axis direction between the point 2150 and the point 2140. Finally, the correction unit 150 compresses the x coordinate of all the points that form the trajectory 2110 to n/(m+n), and the y coordinate to p/(p+q). Thereby, the trajectory 2110 is compressed into a trajectory 2170. Thus, the correction unit 150 compresses the input region 2100 to thereby determine a target region 2180.

As above, the data processing apparatus 100 according to the present modification can properly determine the target region even if the input region has a rectangular shape, as in Modification 5 or the like.

As above, Modifications 1 to 7 of Embodiment 1 according to the present invention have been described. Without contradiction, the respective components in Modifications 1 to 7 may be used in combination. For example, the data processing apparatus 100 may calculate the amount of movement and moving direction of the image within the input region as in Modification 3, and determine the target region as in Modification 5 or 6.

Embodiment 2

Next, Embodiment 2 according to the present invention will be described. Unlike Embodiment 1, the present embodiment includes other processing of calculating the amount of movement and moving direction of the image within the input region and other processing of correcting the input region. Specifically, in the present embodiment, the movement calculation unit calculates the amount of movement and moving direction of the image within the input region concurrently with the input by the user, and the correction unit corrects the input region concurrently with the input by the user. Hereinafter, the data processing apparatus according to the present embodiment will be described with reference to the drawings.

Figure 22:
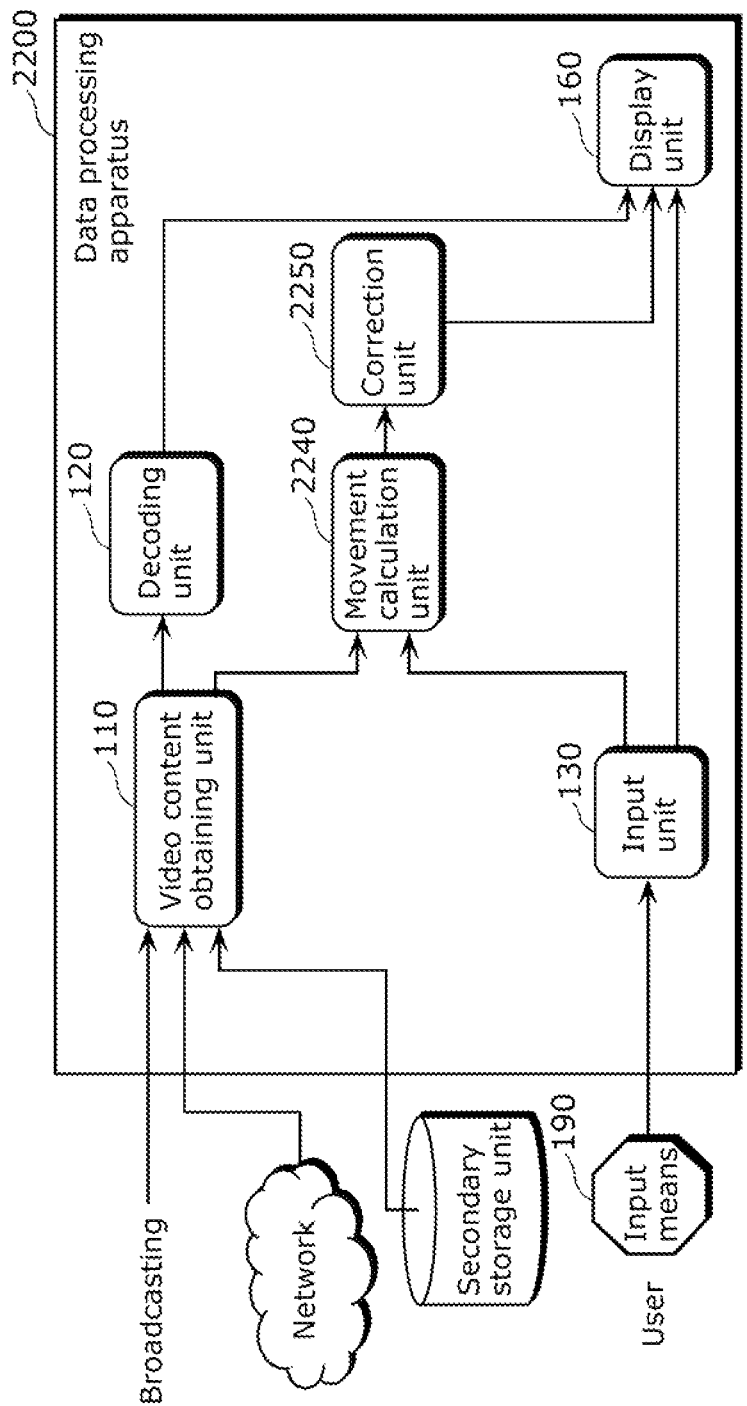
FIG. 22 is a block diagram showing a functional configuration of a data processing apparatus according to Embodiment 2 of the present invention.

FIG. 22 is a block diagram showing a functional configuration of a data processing apparatus 2200 according to Embodiment 2 of the present invention. In FIG. 22, same reference numerals will be given to the same components as those in FIG. 1, and the description thereof will be omitted properly.

The data processing apparatus 2200 includes a video content obtaining unit 110, a decoding unit 120, a display unit 160, a movement calculation unit 2240, and a correction unit 2250, and an input unit 130.

The movement calculation unit 2240 calculates the amount of movement and moving direction of the image within the input region. Specifically, the movement calculation unit 2240 calculates the amount of movement and moving direction of the image within the input region concurrently with the input by the user. In the present embodiment, the movement calculation unit 2240 calculates the amount of movement and moving direction of the image within the input region every time when the picture to be displayed is switched. A method for calculating the amount of movement and moving direction of the image within the input region will be described in detail later.

The correction unit 2250 corrects the input region using the amount of movement and moving direction of the image within the input region calculated by the movement calculation unit 2240. Specifically, the correction unit 2250 corrects the input region concurrently with the input by the user. In the present embodiment, the correction unit 2250 corrects the input region every time when the picture to be displayed is switched and the amount of movement and moving direction of the image within the input region is calculated. A method for correcting the input region will be described in detail later.

Next, a variety of operations in the thus-configured data processing apparatus 2200 will be described. The flow of the entire processing by the data processing apparatus 2200 in the present embodiment are the same as that in FIG. 2 of Embodiment 1, and the illustration thereof will be omitted.

Figure 23:
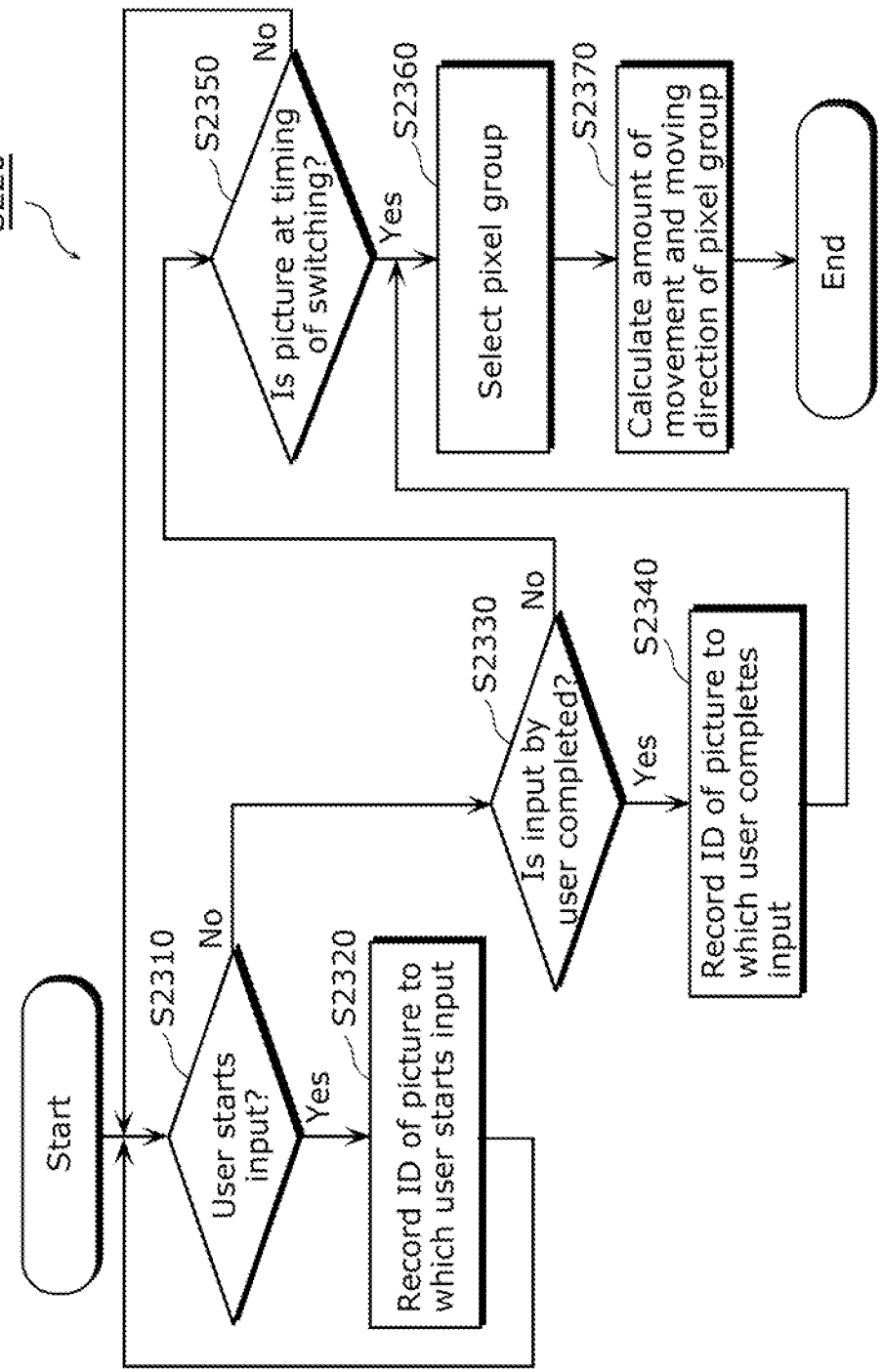
FIG. 23 is a flowchart showing a detailed processing flow of a movement calculation process in Embodiment 2 according to the present invention.

A movement calculation process (Step S220) will be described in detail. FIG. 23 is a flowchart showing a detailed processing flow of the movement calculation process (Step S220) in Embodiment 2 according to the present invention.

When the movement calculation unit 2240 starts receiving the input data from the input unit 130 (Yes in Step S2310), the movement calculation unit 2240 refers to the video content concurrently received from the video content obtaining unit 110, and records the ID of the picture (initial picture) displayed at a timing when the user starts input (Step S2320). Next, when the movement calculation unit 2240 completes receiving the input data from the input unit 130 (Yes in Step S2330), the movement calculation unit 2240 refers to the video content concurrently received from the video content obtaining unit 110, and records the ID of the picture (final picture) displayed at a timing when the user completes the input (Step S2340).

If reception of the input data is not started (No in Step S2310) and reception of the input data is not completed (No in Step S2330), the movement calculation unit 2240 determines whether the picture displayed by the display unit 160 is at a timing of switching (Step S2350). Here, if the displayed picture is not at a timing of switching (No in Step S2350), the movement calculation unit 2240 returns to the processing in Step S2310.

On the other hand, if the displayed picture is at a timing of switching (Yes in Step S2350) or after the processing in Step S2340 is completed, the movement calculation unit 2240 selects the pixel group in order to calculate the amount of movement and moving direction of the image within the input region (Step S2360). The movement calculation unit 2240 calculates the amount of movement and moving direction of the selected pixel group (Step S2370). When calculation of the amount of movement and moving direction of the pixel group is completed, the data processing apparatus 2200 immediately corrects the input region (Step S230).

Here, the processing of calculating the amount of movement and moving direction of the image within the input region and the processing of correcting the input region will be described in detail using FIG. 24 to FIG. 27.

Figure 24:
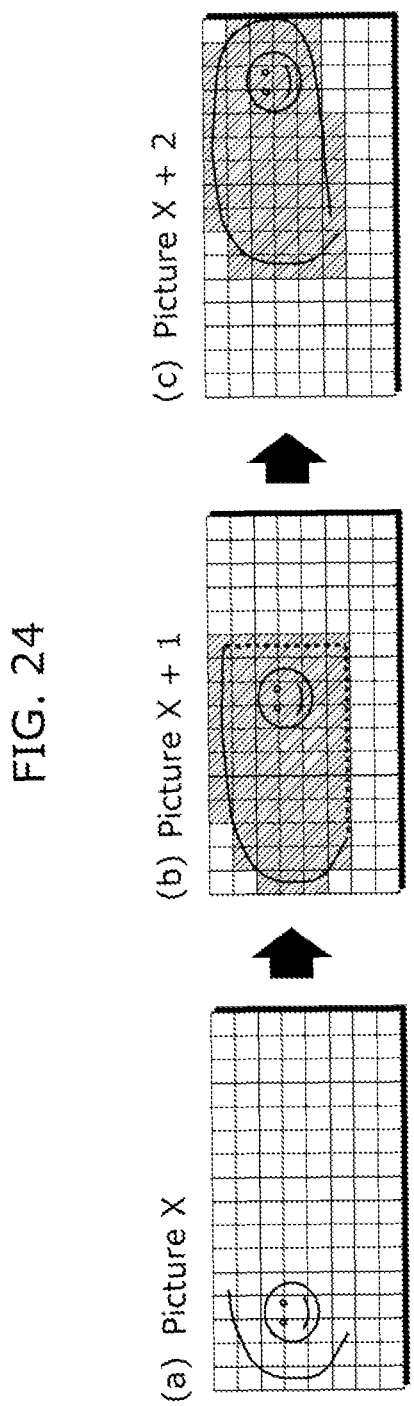
FIG. 24 is a drawing for illustrating a pixel group selected in Embodiment 2 according to the present invention.
Figure 25:
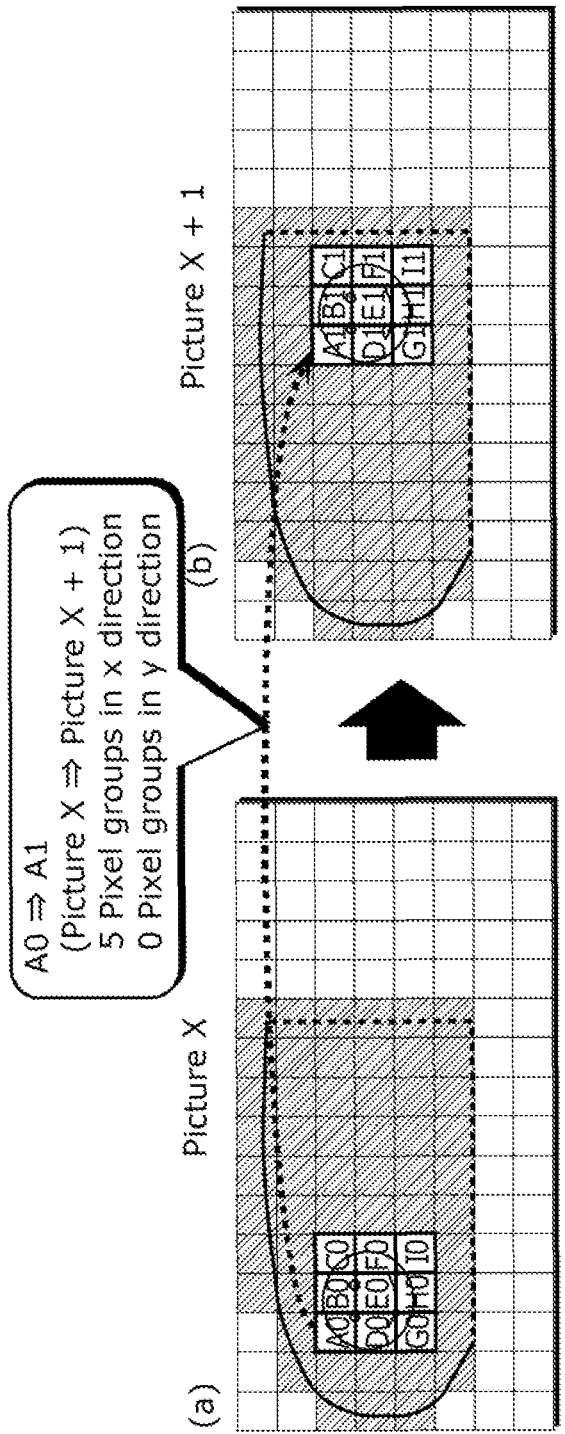
FIG. 25 is a drawing for illustrating a processing of calculating an amount of movement and moving direction of an image within an input region in Embodiment 2 according to the present invention.
Figure 26:
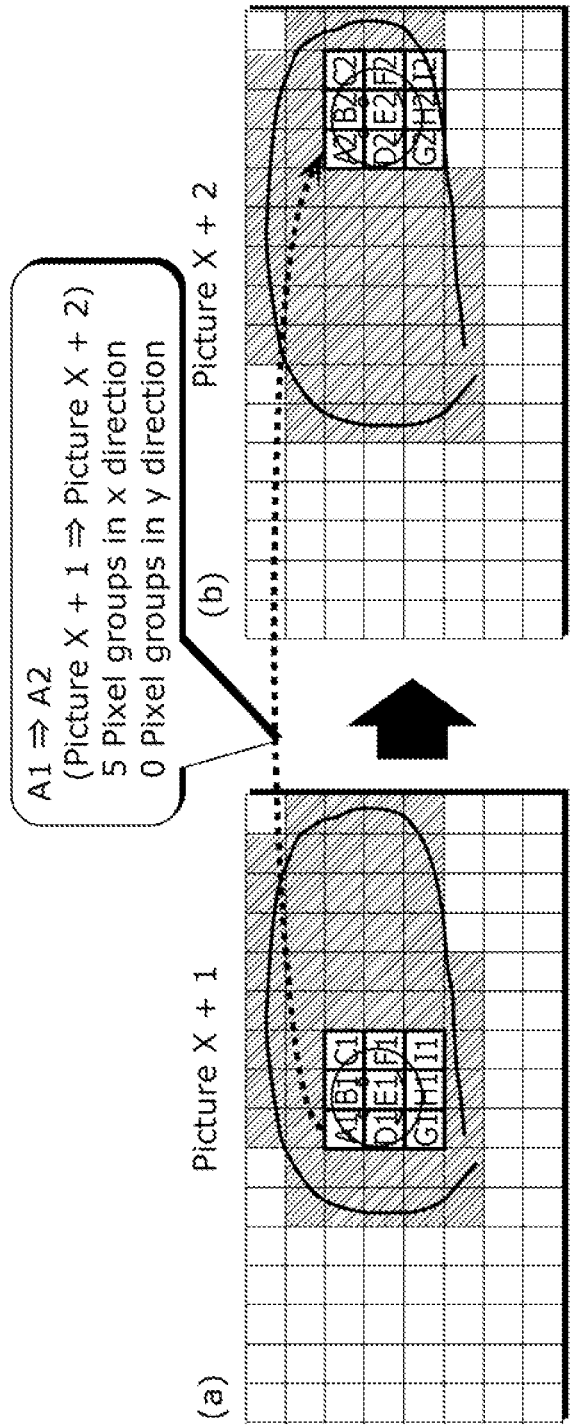
FIG. 26 is a drawing for illustrating a processing of calculating an amount of movement and moving direction of an image within an input region in Embodiment 2 according to the present invention.
Figure 27:
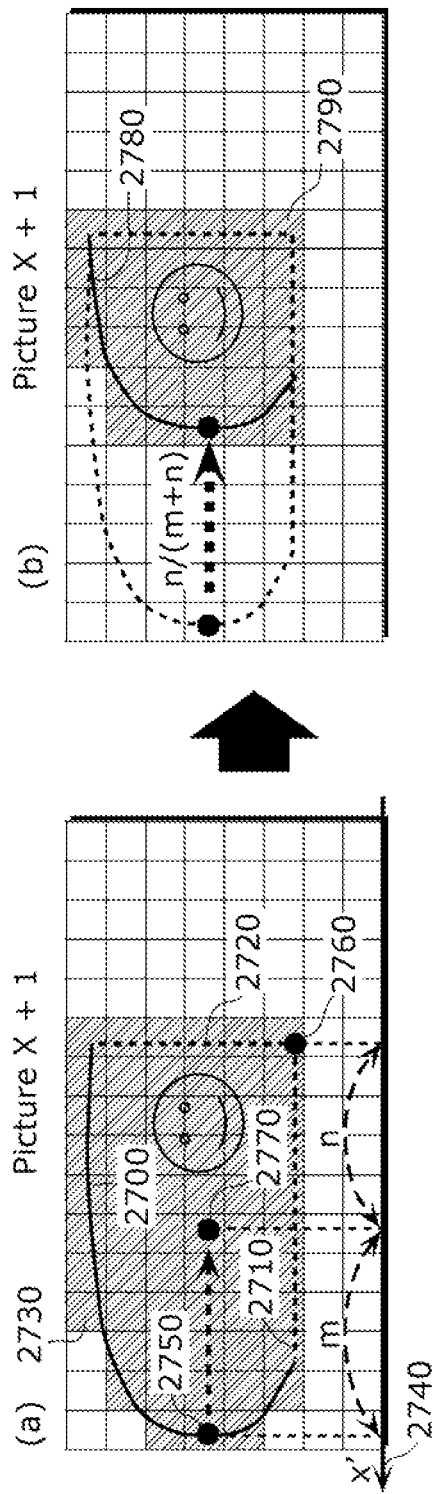
FIG. 27 is a drawing for illustrating a processing of correcting an input region in Embodiment 2 according to the present invention.

FIG. 24 is a drawing for illustrating a pixel group to be selected in Embodiment 2 according to the present invention. FIG. 25 and FIG. 26 are a drawing for illustrating the processing of calculating the amount of movement and moving direction of the image within the input region in Embodiment 2 according to the present invention. FIG. 27 is a drawing for illustrating the processing of correcting the input region in Embodiment 2 according to the present invention.

As shown in FIG. 24, the movement calculation unit 2240 specifies the input region in the picture X+1. Here, the closed region is not formed only by the trajectory input by the user until the picture X+1. Accordingly, the movement calculation unit 2240 complements the trajectory input by the user until the picture X+1 as shown by the dashed line, and specifies the region surrounded by the complemented trajectory as the input region. Subsequently, the movement calculation unit 2240 selects the pixel group (hatched pixel group) contained in the identified input region. The method for complementing a trajectory is an example. The trajectory may be complemented in any manner as long as the trajectory is complemented so as to surround the object.

Next, as shown in FIG. 25, the movement calculation unit 2240 calculates the amount of movement and moving direction of the pixel group selected in the picture X+1. While in FIG. 25, the selected pixel group is different from that in FIG. 7 of Embodiment 1, the method for calculating the amount of movement and moving direction of the pixel group is the same. Next, as shown in FIG. 27, the correction unit 2250 corrects the input region. Specifically, the correction unit 2250 corrects an input region 2730 surrounded by a trajectory 2700 input by the user until the picture X+1, a line segment 2710 extending from the one end point of the trajectory 2700 in the horizontal direction, and a line segment 2720 extending from the other end point of the trajectory 2700 in the vertical direction.

More specifically, first, the correction unit 2250 sets an x'-axis 2740 parallel to the moving direction of the image within the input region calculated by the movement calculation unit 2240.

Next, the correction unit 2250 specifies a point 2750 located at the leftmost in the x'-axis direction, a point 2760 located at the rightmost, and a point 2770 obtained by moving the point 2750 in the calculated moving direction by the calculated amount of movement among all the points that form the trajectory 2700. Next, the correction unit 2250 calculates a distance m in the x'-axis direction between the point 2750 and the point 2770 and a distance n in the x'-axis direction between the point 2760 and the point 2770. Finally, wherein the x' coordinate of the point 2760 is 0, the correction unit 2250 compresses the x' coordinate of all the points that form the trajectory 2700 to n/(m+n). Thereby, the trajectory 2700 input by the user is compressed into a trajectory 2780. Thus, the correction unit 2250 compresses the input region 2730 to thereby determine a target region 2790.

The displayed picture is switched from the picture X+1 to the picture X+2. Then, in the picture X+2, the movement calculation unit 2240 specifies the region surrounded by the trajectory corrected in the picture X+1 and the trajectory input by the user in the displayed picture X+2 as the input region, as shown in (c) of FIG. 24. Subsequently, the movement calculation unit 2240 selects the pixel group within the specified input region. Subsequently, as shown in FIG. 26, the movement calculation unit 2240 calculates the amount of movement and moving direction of the selected pixel group as the amount of movement and moving direction of the image within the input region.

The correction unit 2250 corrects the input region in the picture X+2 as in the same manner as in the picture X+1 to thereby determine the target region. The correction unit 2250 does not always need to correct the input region in the picture X+2. Namely, the correction unit 2250 may determine the region corrected in the picture X+1 as the target region.

As above, the data processing apparatus 2200 according to the present embodiment can correct the input region concurrently with the input by the user. Accordingly, for example, the target region can be displayed in real time. This can assist the user to properly input the trajectory.

In the present embodiment, the correction unit 2250 corrects the input region every time when the displayed picture is switched. Namely, the correction unit 2250 corrects the input region for each picture, but does not always need to correct the input region for each picture. For example, the correction unit 2250 may correct the input region for every two or more pictures. The movement calculation unit 2240 may also calculate the amount of movement and moving direction of the image within the input region for every two or more pictures.

Embodiment 3

Next, Embodiment 3 according to the present invention will be described. In the present embodiment, after the input by the user is completed, the correction unit corrects the input region on the basis of the trajectory expressed by the input data to thereby determine the target region. Namely, the data processing apparatus according to the present embodiment determines the target region without using the amount of movement and moving direction of the image within the input region. Hereinafter, the data processing apparatus according to the present embodiment will be described with reference to the drawings.

Figure 28:
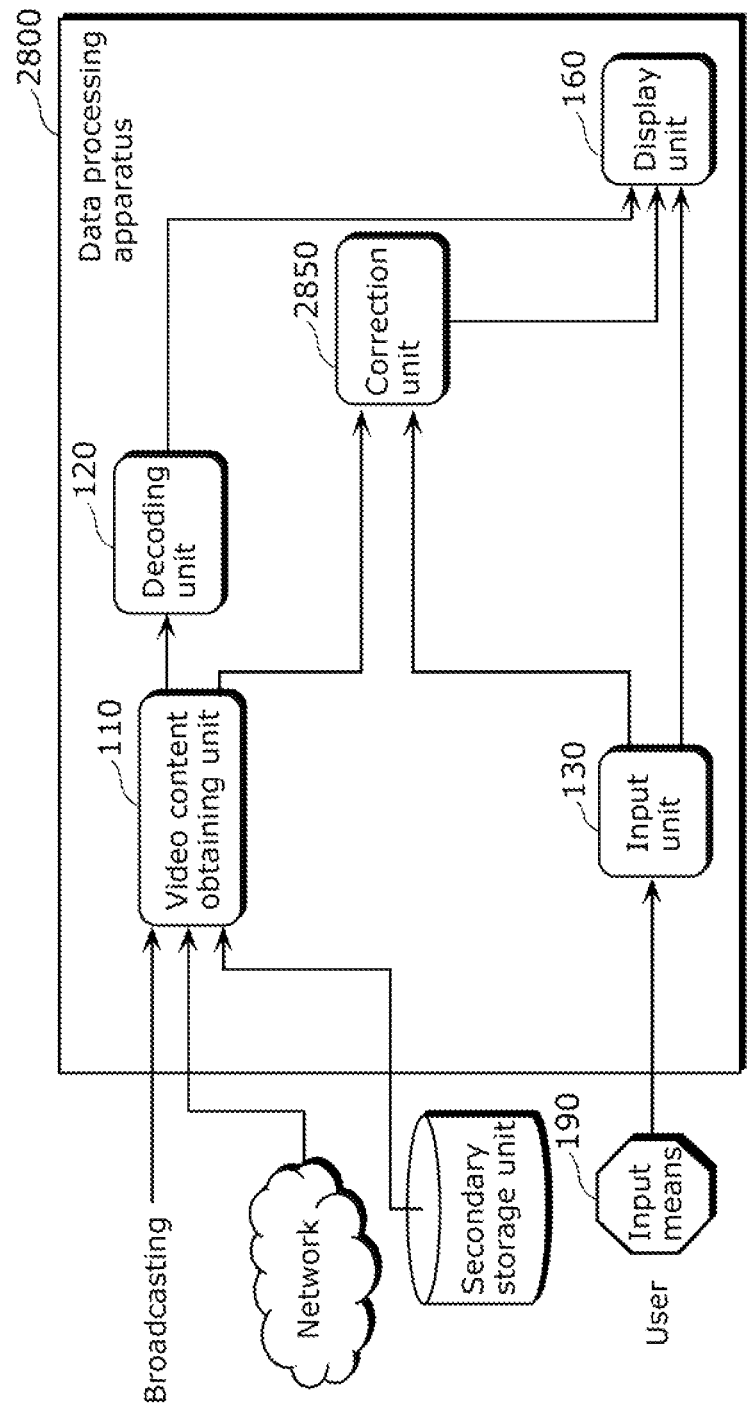
FIG. 28 is a block diagram showing a functional configuration of a data processing apparatus according to Embodiment 3 of the present invention.

FIG. 28 is block diagram showing a functional configuration of a data processing apparatus 2800 according to Embodiment 3 of the present invention. In FIG. 28, same reference numerals will be given to the same components as those in FIG. 1, and the description will be omitted properly.

The data processing apparatus 2800 includes a video content obtaining unit 110, a decoding unit 120, a display unit 160, a correction unit 2850, and an input unit 130.

The correction unit 2850 corrects the input region. Specifically, after the input by the user across several pictures is completed, the correction unit 2850 corrects the input region on the basis of the trajectory expressed by the input data to thereby determine the target region. In the present embodiment, the correction unit 2850 approximates the trajectory expressed by the input data to an ellipse. In the picture in which the point of intersection between the long axis of the ellipse and the trajectory is input, the correction unit 2850 determines a region in the vicinity of the point of intersection as the target region.

Next, a variety of operations in the data processing apparatus 2800 will be described. A variety of operations in the thus-configured data processing apparatus 2800 will be described.

Figure 29:
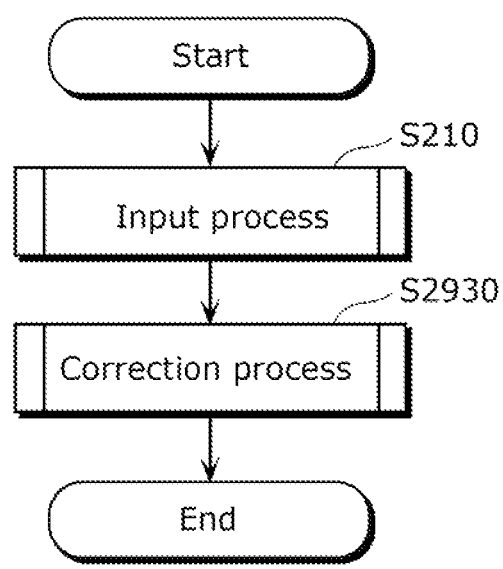
FIG. 29 is a flowchart showing a flow of a whole processing by the data processing apparatus in Embodiment 3 according to the present invention.

FIG. 29 is a flowchart showing a flow of a whole processing by the data processing apparatus 2800 in Embodiment 3 according to the present invention. In FIG. 29, same reference numerals will be given to the same processings as those in FIG. 2, and the description thereof will be omitted.

As shown in FIG. 29, the data processing apparatus 2800 executes an input process of receiving the input data (Step S210) and a correction process of correcting the input region (Step S2930).

FIG. 30 is a drawing showing an example of a trajectory expressed by the input data in Embodiment 3 according to the present invention. Specifically, FIG. 30 is a drawing showing an example of a process to which the user inputs the trajectory across several pictures in order to surround a moving object in the video content.

In the four pictures (pictures X, X+1, X+2, and X+3) contained in the video content, an object 3020 moves from left to right in the horizontal direction. The user inputs trajectories 3010, 3011, 3012, and 3013 in order to surround the object 3020. Finally, the user unintendedly inputs an elliptical trajectory 3013 following the movement of the object 3020.

Here, a correction process (Step S2930) will be described in detail. FIG. 31 is a flowchart showing a detailed processing flow of a correction process (Step S2930) in Embodiment 3 according to the present invention.

When the correction unit 2850 starts receiving the input data from the input unit 130, the correction unit 2850 refers to the video content concurrently received from the video content obtaining unit 110, and records the ID of the picture (initial picture) displayed at a timing when the user starts the input (Step S510). Next, when the correction unit 2850 completes reception of the input data from the input unit 130 (Step S520), the correction unit 2850 refers to the video content concurrently received from the video content obtaining unit 110, and records the ID of the picture (final picture) displayed at a timing when the user completes the input (Step S530).

Next, among the several pictures to which the user inputs the trajectory, the correction unit 2850 selects the picture for correcting the input region (Step S3140). Specifically, the correction unit 2850 approximates the trajectory expressed by the input data to an ellipse after the user completes the input, and selects the picture in which the point of intersection between the long axis of the ellipse and the trajectory is input.

FIG. 32 is a drawing for illustrating a picture for correcting the input region in Embodiment 3 according to the present invention. First, the correction unit 2850 calculates an ellipse 3210 to be finally approximated to a trajectory 3013 input by the user.

Subsequently, among two points of intersection between the calculated long axis of the ellipse 3220 and the trajectory 3013 input by the user, the correction unit 2850 specifies a point of intersection 3240 far from the start point 3230 of the trajectory 3013.

Next, as the picture for correcting the input region, the correction unit 2850 selects the picture X+2 displayed at a timing when the specified point of intersection 3240 is input.

Next, the correction unit 2850 corrects the input region in the selected picture (Step S3150). Specifically, the correction unit 2850 determines the region in the vicinity of the specified point of intersection as the target region in the selected picture.

Figure 33A:
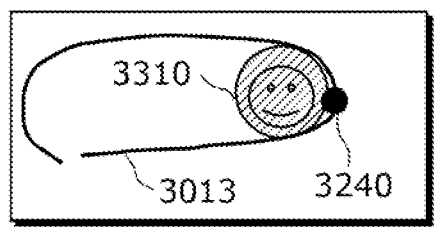
FIG. 33A is a drawing showing an example of a method for correcting an input region in Embodiment 3 according to the present invention.
Figure 33B:
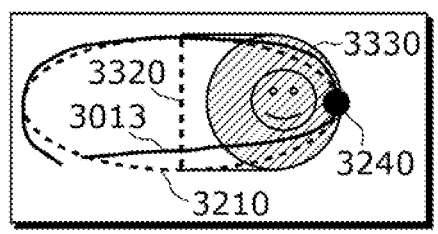
FIG. 33B is a drawing showing an example of a method for correcting an input region in Embodiment 3 according to the present invention.
Figure 33C:
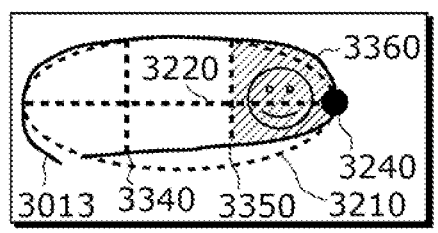
FIG. 33C is a drawing showing an example of a method for correcting an input region in Embodiment 3 according to the present invention.

FIG. 33A to FIG. 33C each are a drawing showing an example of a method for correcting the input region in Embodiment 3 according to the present invention.

For example, as shown in FIG. 33A, the correction unit 2850 determines a region 3310 surrounded by a circle inscribed in the trajectory in the vicinity of the point of intersection 3240 as the target region in the selected picture X+2.

For example, as shown in FIG. 33B, in the selected picture X+2, as the target region, the correction unit 2850 determines a region surrounded by a circle 3330 whose diameter is as long as a short diameter 3320 of an ellipse 3210 and which intersects the point of intersection 3240.

For example, as shown in FIG. 33C, in the selected picture X+2, the correction unit 2850 equally divides a long axis 3220 by the number of pictures displayed from the initial picture X to the selected picture X+2 (here, "3"). Of the regions surrounded by line segments 3340 and 3350 that intersect the dividing point and perpendicularly intersect the long axis 3220 and a trajectory 3013, the correction unit 2850 determines a region 3360 containing the point of intersection 3240 as the target region.

The correction unit 2850 may approximate the trajectory expressed by the input data to an ellipse, and correct the input region as the region in the vicinity of the point of intersection between the long axis of the ellipse and the trajectory, and the correction method will not be limited to the method above.

As above, the data processing apparatus 2800 according to the present embodiment can correct the input region on the basis of the shape of the trajectory, and calculation of the amount of movement and moving direction of the image within the input region is unnecessary. Accordingly, calculation load can be reduced.

Further, the data processing apparatus 2800 according to the present embodiment can approximate the trajectory to an ellipse, and determine the region in the vicinity of the point of intersection farthest from the start point in the picture in which the point of intersection farthest from the start point of the trajectory among the points of intersection between the long axis of the ellipse and the trajectory is input. Accordingly, the region in the vicinity of a position in which the trajectory for surrounding the object starts to be closed can be determined as the target region. Namely, because it is thought that the object exists in the position in which the trajectory starts to be closed, the target region containing the object can be properly determined.

Embodiment 4

Next, Embodiment 4 according to the present invention will be described. In the present embodiment, the correction unit complements the trajectory expressed by the input data to thereby determine the target region. Namely, the data processing apparatus according to the present embodiment determines the target region without using the amount of movement and moving direction of the image within the input region as in Embodiment 3. Hereinafter, the data processing apparatus according to the present embodiment will be described with reference to the drawings.

FIG. 34 is a block diagram showing a functional configuration of a data processing apparatus 3400 according to Embodiment 4 of the present invention. In FIG. 34, same reference numerals will be given to the same components as those in FIG. 1, and the description thereof will be omitted properly.

The data processing apparatus 3400 includes a video content obtaining unit 110, a decoding unit 120, a display unit 160, a correction unit 3450, and an input unit 130.

The correction unit 3450 complements the trajectory expressed by the input data to thereby determine the target region. In the present embodiment, the correction unit 3450 approximates the trajectory expressed by the input data to an ellipse to thereby complement the trajectory.

Next, a variety of operations in the thus-configured data processing apparatus 3400 will be described. A flow of the whole processing by the data processing apparatus 3400 according to the present embodiment is the same as that in FIG. 29 of Embodiment 3, and the illustration thereof will be omitted.

Figure 35:
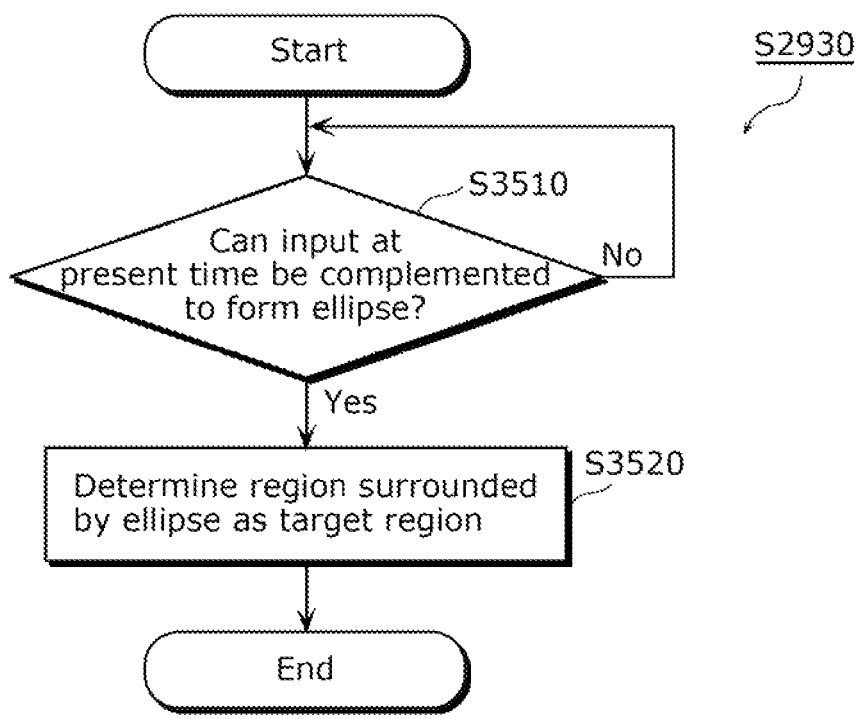
FIG. 35 is a flowchart showing a detailed processing flow of a correction process in Embodiment 4 according to the present invention.

FIG. 35 is a flowchart showing a detailed processing flow of the correction process (Step S2930) in Embodiment 4 according to the present invention.

The correction unit 3450 determines whether the trajectory input until the picture currently displayed can be complemented to form an ellipse (Step S3510). Namely, the correction unit 3450 determines whether the trajectory can be approximated to an ellipse. Here, if the ellipse cannot be formed by complementation of the trajectory (No in Step S3510), the processing in Step S3510 is repeated.

On the other hand, if the trajectory can be complemented to form an ellipse (Yes in Step S3510), as the target region, the correction unit 3450 determines the region surrounded by the ellipse formed by complementation of the trajectory (Step S3520). Namely, the correction unit 3450 approximates the trajectory expressed by the input data to an ellipse to thereby complement the trajectory, and determines the region surrounded by the complemented trajectory as the target region.

Figure 36:
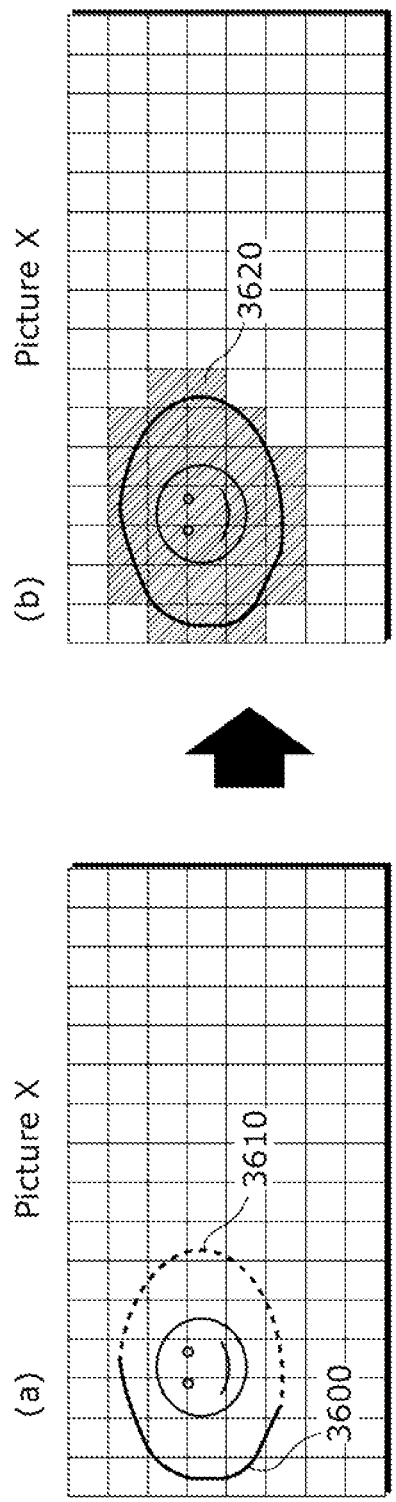
FIG. 36 is a drawing showing an example of a target region surrounded by a complemented trajectory in Embodiment 4 according to the present invention.

FIG. 36 is a drawing showing an example of a target region surrounded by a complemented trajectory in Embodiment 4 according to the present invention. The correction unit 3450 adds a curved line 3610 to a trajectory 3600 expressed by the input data so as to provide an ellipse approximated to the trajectory 3600. The correction unit 3450 determines the region surrounded by the trajectory 3600 and the curved line 3610 (hatched region) as a target region 3620.

As above, the data processing apparatus 3400 according to the present embodiment can complement the trajectory input by the user to thereby determine the target region. Accordingly, the target region can be properly determined before the object moves largely.

Further, the data processing apparatus 3400 according to the present embodiment can approximate the trajectory input by the user to an ellipse to thereby complement the trajectory. In the case where the user inputs a trajectory in order to surround a moving object, the shape of the trajectory is usually likely to be elliptical. Moreover, if the shape of the trajectory is elliptical, approximation can be performed at the relatively small number of points. Accordingly, the trajectory input by the user can be approximated to an ellipse to thereby properly determine the target region.

The correction unit 3450 does not always need to approximate the trajectory to an ellipse. For example, if it is known in advance that the user inputs a rectangular trajectory or the like, the correction unit 3450 may approximate the trajectory to a rectangle.

Embodiment 5

Next, Embodiment 5 according to the present invention will be described. In the present embodiment, on the basis of the input data, the correction unit determines an algorithm for determining the target region, and corrects the input region according to the determined algorithm to thereby determine the target region. Hereinafter, the data processing apparatus according to the present embodiment will be described with reference to the drawings.

Figure 37:
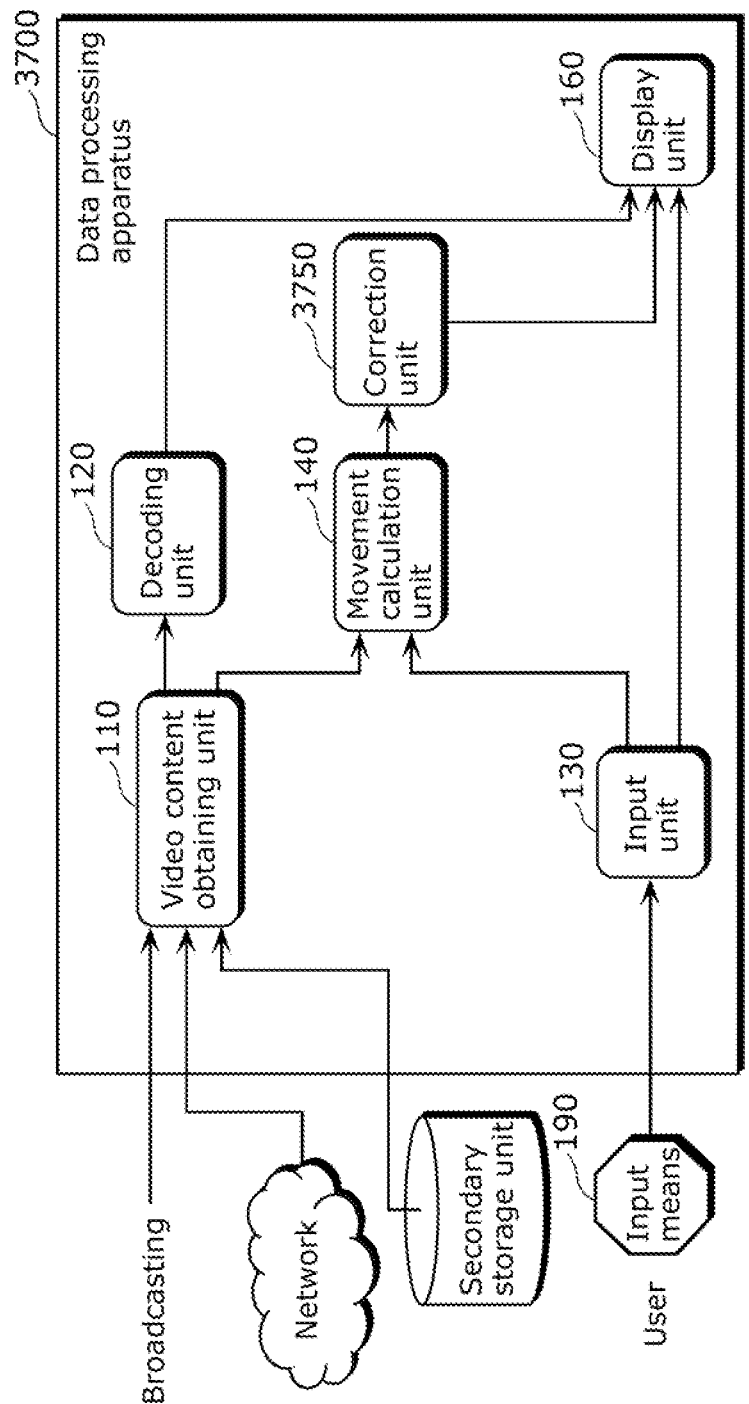
FIG. 37 is a block diagram showing a functional configuration of a data processing apparatus according to Embodiment 5 of the present invention.

FIG. 37 is a block diagram showing a functional configuration of a data processing apparatus 3700 in Embodiment 5 according to the present invention. In FIG. 37, same reference numerals will be given to the same components as those in FIG. 1, and the description thereof will be omitted properly.

The data processing apparatus 3700 includes a video content obtaining unit 110, a decoding unit 120, a display unit 160, a movement calculation unit 140, a correction unit 3750, and an input unit 130.

On the basis of the input data, the correction unit 3750 determines an algorithm for determining the target region. The correction unit 3750 corrects the input region according to the determined algorithm to thereby determine the target region.

Specifically, on the basis of the input data, the correction unit 3750 determines whether to correct the input region using the amount of movement and moving direction of the image within the input region as in Embodiment 1 or 2.

For example, on the basis of the shape of the trajectory expressed by the input data, the correction unit 3750 determines whether to correct the input region using the amount of movement and moving direction of the image within the input region. For example, on the basis of fluctuation in the amount of movement and moving direction of the image within the input region, the correction unit 3750 also determines whether to correct the input region using the amount of movement and moving direction of the amount of movement and moving direction of the image within the input region.

Next, a variety of operations of the thus-configured data processing apparatus 3700 will be described. A flow of the whole processing by the data processing apparatus 3700 according to the present embodiment is the same as that in FIG. 2 of Embodiment 1, and the illustration thereof will be omitted.

Figure 38:
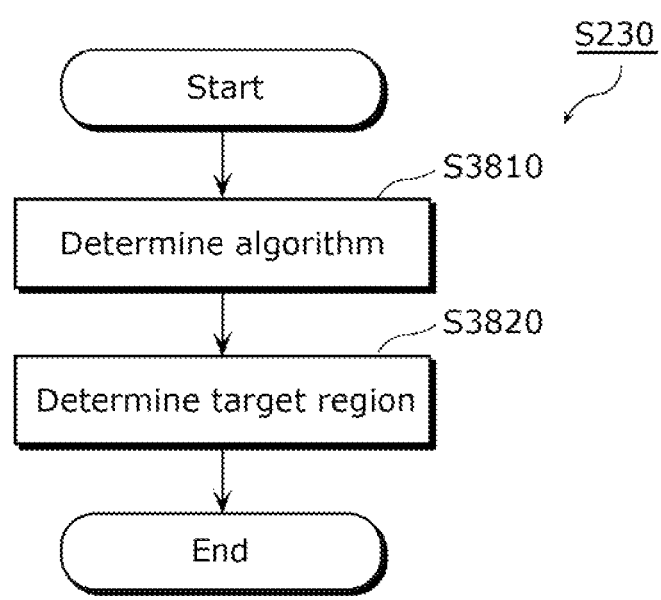
FIG. 38 is a flowchart showing a detailed processing flow of a correction process in Embodiment 5 according to the present invention.

Here, a correction process different from that in Embodiment 1 (Step S230) will be described in detail. FIG. 38 is a flowchart showing a detailed processing flow of a correction process (Step S230) in Embodiment 5 according to the present invention.

First, on the basis of the input data, the correction unit 3750 determines an algorithm for determining the target region most properly (Step S3810). Subsequently, the correction unit 3750 corrects the input region according to the determined algorithm to thereby determine the target region (Step S3820).

Figure 39:
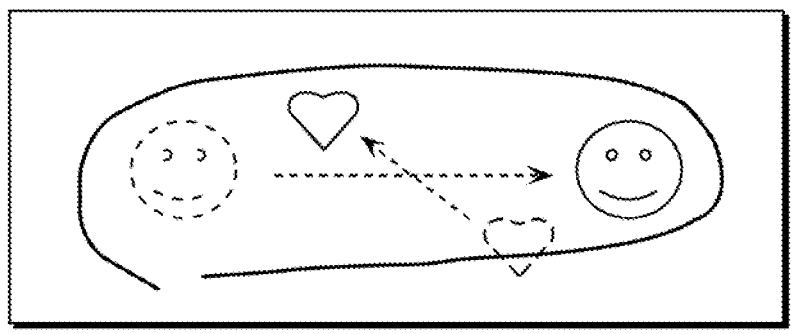
FIG. 39 is a drawing for illustrating an example of a method for determining an algorithm in Embodiment 5 according to the present invention.
Figure 40:
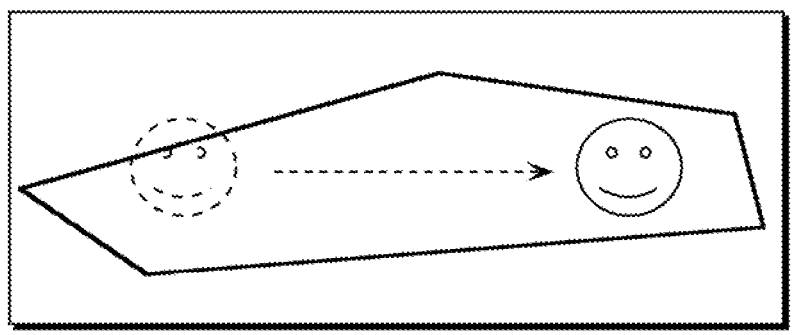
FIG. 40 is a drawing for illustrating an example of other method for determining an algorithm in Embodiment 5 according to the present invention.
Figure 41:
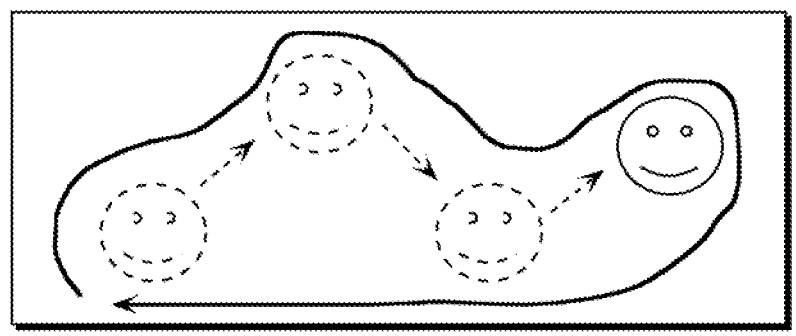
FIG. 41 is a drawing for illustrating an example of further other method for determining an algorithm in Embodiment 5 according to the present invention.

Hereinafter, an example of a method for determining the algorithm will be described using FIG. 39 to FIG. 41. FIG. 39 to FIG. 41 each are a drawing for illustrating an example of a method for determining the algorithm in Embodiment 5 according to the present invention.

For example, as shown in FIG. 39, in the case where the several moving objects exist in the input region, the correction unit 3750 determines not to correct the input region using the amount of movement and moving direction of the image within the input region. Specifically, if the value showing fluctuation in the amount of movement and moving direction of the pixel group contained in the input region is not less than a threshold value, the correction unit 3750 determines not to correct the input region using the amount of movement and moving direction of the image within the input region. The value showing fluctuation is the variance or standard deviation, for example.

Thus, if several moving objects exist within the input region, it is difficult to calculate the amount of movement and moving direction of the object that the use tries to surround. Accordingly, the correction unit 3750 can determine not to correct the input region using the amount of movement and moving direction of the image within the input region, to thereby properly determine the target region.

For example, as shown in FIG. 40, the correction unit 3750 also can determine whether to approximate the trajectory expressed by the input data to an ellipse. For example, the correction unit 3750 determines whether the value showing a difference between the ellipse obtained on the basis of the trajectory expressed by the input data and the trajectory is greater than the threshold value determined in advance, to thereby determine whether to approximate the trajectory to the ellipse.

Here, if the trajectory cannot be approximated to the ellipse, the correction unit 3750 determines to correct the input region using the amount of movement and moving direction of the image within the input region. Thereby, even if the method for complementing the trajectory as in Embodiment 4 cannot be used, the correction unit 3750 can properly determine the target region.

For example, as shown in FIG. 41, in the case where the movement of the object is complex and the trajectory forms a distorted closed region, the correction unit 3750 determines not to correct the input region using the amount of movement and moving direction of the image within the input region. In such a case, the correction unit 3750 complements the trajectory to thereby determine the target region as in Embodiment 4.

The method for determining the algorithm above is an example, and the correction unit 3750 may determine the algorithm on the basis of a different criterion.

As above, on the basis of the input data, the data processing apparatus 3700 according to the present embodiment can properly determine the algorithm for determining the target region, and can determine the target region more properly.

As above, the data processing apparatus according to embodiments of the present invention has been described on the basis of embodiments, but the present invention will not be limited to these embodiments. Without departing from the scope of the present invention, the present invention also includes an embodiment with various modifications on the present embodiment that are conceived by a person skilled in the art, or an embodiment in combination with components in a different embodiment or a modification thereof.

Figure 42:
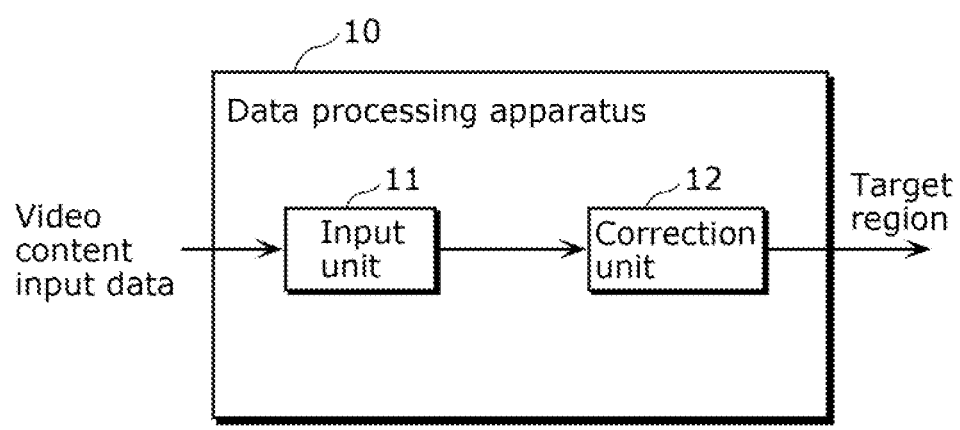
FIG. 42 is a block diagram showing a functional configuration of a data processing apparatus according to one embodiment of the present invention.

For example, in Embodiments 1 to 5 above, the data processing apparatus includes the video content obtaining unit 110, the decoding unit 120, and the display unit 160, but does not always need to include these components. For example, as shown in FIG. 42, a data processing apparatus 10 may include an input unit 11 and a correction unit 12. Even in this case, for example, the data processing apparatus 10 can provide the same effect as that in the embodiments above if the correction unit 12 outputs a target region or an image within the target region to a display unit.

Moreover, in Embodiments 1 to 5, the display unit displays the target region determined by the correction unit, but does not always need to display the target region. In this case, for example, the correction unit may transmit a target region or an image within the target region to a picture retrieving apparatus.

Moreover, part or all of the components that the data processing apparatuses according to Embodiments 1 to 5 include may be composed of one system LSI (Large Scale Integration). For example, the data processing apparatus may be composed of a system LSI having an input unit and a correction unit.

The system LSI is an ultra multifunctional LSI manufactured by integrating a plurality of components on a chip, and specifically, is a computer system including a microprocessor, a ROM (Read Only Memory), a RAM (Random Access Memory), and the like. The RAM stores a computer program. The microprocessor operates according to the computer program, and the system LSI achieves the function.

Here, while the LSI is referred to the system LSI, it may be referred to as an IC, an LSI, a super LSI, or an ultra LSI depending on the degree of integration. Moreover, the method for integration is not limited to the LSI, and integration may be achieved using a dedicated circuit or a general-purpose processor. After manufacturing the LSI, a programmable FPGA (Field Programmable Gate Array) or a reconfigurable processor in which connection or setting of the circuit within the LSI can be reconfigured may be used.

Further, if a technique of integration to replace the LSI appears because of progress in the semiconductor techniques or other techniques derived therefrom, the functional blocks may be naturally integrated using such a technique. Examples thereof may include application of biotechnology.

Moreover, the present invention can be achieved as a data processing apparatus including the characteristic components as described above, but also can be achieved as a data processing method including the processings of the characteristic components included in the data processing apparatus. Alternatively, the present invention can be achieved as a computer program causing a computer to execute each of the characteristic processings included in the data processing method. Such a computer program can be distributed through a non-temporary computer readable recording medium such as a CD-ROM and a communicating medium such as the Internet.

INDUSTRIAL APPLICABILITY

The data processing apparatus according to one embodiment of the present invention is useful as a data processing apparatus that properly determines a target region within a picture contained in a video content on the basis of a trajectory input by a user in order to surround a moving object in the video content. Further, the data processing apparatus according to one embodiment of the present invention is also useful as a video content retrieving apparatus or the like that retrieves a video content different from the displayed video content using the determined target region.

REFERENCE SIGNS LIST 10, 100, 2200, 2800, 3400, 3700 Data processing apparatus
11, 130 Input unit
12, 150, 2250, 2850, 3450, 3750 Correction unit
110 Moving picture content obtaining unit
20 Decoding unit
40, 2240 Movement calculation unit
60 Display unit
90 Input means

The invention claimed is:

1. A data processing apparatus that determines a target region within a picture contained in a video content based on a trajectory input by a user in order to surround a moving object in the video content, said data processing apparatus comprising:
a physical processor configured to function as:
an input unit receiving input data showing the trajectory input by the user in the video content displayed; and
a correction unit (i) determining an algorithm used for determining the target region and (ii) based on the determined algorithm, determining the target region by correcting an input region, which is a region specified by the trajectory expressed by the input data,
wherein the input data shows the trajectory input by the user across several pictures contained in the video content in order to surround the moving object when the several pictures are displayed sequentially, and
wherein, the correction unit determines the algorithm, such that (i) when a value showing a fluctuation in an amount of movement and a moving direction of an image contained in the input region is not less than a threshold value, the correction unit determines not to correct the input region using the amount of movement and the moving direction of the image within the input region, (ii) when the trajectory input by the user forms a distorted closed region, the correction unit determines not to correct the input region using the amount of movement and the moving direction of the image within the input region, and (iii) when the trajectory input by the user cannot be approximated by an ellipse, the correction unit determines to correct the input region using the amount of movement and the moving direction of the image within the input region.

2. The data processing apparatus according to claim 1, wherein said physical processor functions as a movement calculation unit calculating the amount of movement and the moving direction of the image within the input region in the several pictures.

3. The data processing apparatus according to claim 2, wherein said correction unit corrects the input region after the user completes the input.

4. The data processing apparatus according to claim 3, wherein said correction unit determines, as the target region, an intersection of a region after movement obtained by moving the input region according to the amount of movement and the moving direction of the image within the input region and the input region.

5. The data processing apparatus according to claim 4, wherein said correction unit determines an intersection of the region after movement obtained by moving the input region in the moving direction by the amount of movement and the input region as the target region in a final picture among the several pictures.

6. The data processing apparatus according to claim 4, wherein said correction unit determines an intersection of the region after movement obtained by moving the input region in a direction opposite to the moving direction by the amount of movement and the input region as the target region in an initial picture among the several pictures.

7. The data processing apparatus according to claim 4, wherein said movement calculation unit selects at least one pixel group in at least initial one picture among the several pictures based on the input trajectory, and calculates an amount of movement and moving direction of the selected pixel group as the amount of movement and moving direction of the image within the input region.

8. The data processing apparatus according to claim 3, wherein said correction unit compresses the input region according to the amount of movement and the moving direction, so as to determine the target region.

9. The data processing apparatus according to claim 8, wherein said correction unit compresses the input region in the moving direction by the amount of movement, so as to determine the target region in the final picture among the several pictures.

10. The data processing apparatus according to claim 8, wherein said correction unit compresses the input region in a direction opposite to the moving direction by the amount of movement, so as to determine the target region in the initial picture among the several pictures.

11. The data processing apparatus according to claim 8, wherein said movement calculation unit selects at least one pixel group in at least initial one picture among the several pictures based on the input trajectory, and calculates an amount of movement and moving direction of the selected pixel group as the amount of movement and moving direction of the image within the input region.

12. The data processing apparatus according to claim 2,
wherein said movement calculation unit calculates the amount of movement and the moving direction of the image within the input region concurrently with the input, and
wherein said correction unit corrects the input region concurrently with the input.

13. The data processing apparatus according to claim 1,
wherein said correction unit corrects the input region based on a shape of the trajectory expressed by the input data after the input across the several pictures is completed, so as to determine the target region.

14. The data processing apparatus according to claim 13, wherein said correction unit approximates the trajectory expressed by the input data to the ellipse, and determines a region in the vicinity of a point of intersection as the target region in a picture in which the point of intersection is input, the point of intersection being a point of intersection farthest from a start point of the trajectory among points of intersection between a long axis of the ellipse and the trajectory.

15. The data processing apparatus according to claim 1, wherein said correction unit complements the trajectory expressed by the input data, so as to determine the target region.

16. The data processing apparatus according to claim 15, wherein said correction unit approximates the trajectory expressed by the input data to the ellipse, so as to complement the trajectory.

17. The data processing apparatus according to claim 1, wherein the data processing apparatus is configured as an integrated circuit.

18. A data processing method for determining a target region within a picture contained in a video content, based on a trajectory input by a user in order to surround a moving object in the video content, said method comprising:
receiving input data showing the trajectory input by the user in the video content displayed;
determining an algorithm used for determining the target region; and
based on the determined algorithm, determining the target region by correcting an input region, which is a region specified by the trajectory expressed by the input data,
wherein the input data shows the trajectory input by the user across several pictures contained in the video content in order to surround the moving object when the several pictures are displayed sequentially, and
wherein said determining of the algorithm determines the algorithm, such that (i) when a value showing a fluctuation in an amount of movement and a moving direction of an image contained in the input region is not less than a threshold value, said determining of the target region determines not to correct the input region using the amount of movement and the moving direction of the image within the input region, (ii) when the trajectory input by the user forms a distorted closed region, said determining of the target region determines not to correct the input region using the amount of movement and the moving direction of the image within the input region, and (iii) when the trajectory input by the user cannot be approximated by an ellipse, said determining of the target region determines to correct the input region using the amount of movement and the moving direction of the image within the input region.

19. A non-transitory computer-readable recording medium having a program recorded thereon the program causing a computer to execute the data processing method according to claim 18.

* * * * *